United States Patent
Yamakawa et al.

(10) Patent No.: US 8,089,241 B2
(45) Date of Patent: Jan. 3, 2012

(54) MOTOR DRIVE CONTROL APPARATUS, VEHICLE EQUIPPED WITH MOTOR DRIVE CONTROL APPARATUS, AND MOTOR DRIVE CONTROL METHOD

(75) Inventors: Toshifumi Yamakawa, Okazaki (JP); Kazuhito Hayashi, Inazawa (JP); Masayoshi Suhama, Toyota (JP); Hideto Hanada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 415 days.

(21) Appl. No.: 12/404,624

(22) Filed: Mar. 16, 2009

(65) Prior Publication Data
US 2009/0237019 A1 Sep. 24, 2009

(30) Foreign Application Priority Data
Mar. 18, 2008 (JP) ................... 2008-070099

(51) Int. Cl.
*H02P 3/18* (2006.01)
(52) U.S. Cl. .............. 318/812; 318/400.03; 318/400.09; 180/65.21; 180/65.275; 180/65.285
(58) Field of Classification Search ............ 318/400.03, 318/400.09, 812; 180/65.21, 65.275, 65, 180/285
See application file for complete search history.

(56) References Cited

U.S. PATENT DOCUMENTS
2004/0124807 A1* 7/2004 Nakata et al. ............... 318/801
2007/0069673 A1* 3/2007 Oyobe et al. ............... 318/376
2008/0315803 A1* 12/2008 Yonemori et al. .......... 318/148

FOREIGN PATENT DOCUMENTS
| JP | 2002-256920 A | 9/2002 |
| JP | 2004-080998 A | 3/2004 |
| JP | 2006-050805 A | 2/2006 |
| JP | 2006-136184 A | 5/2006 |
| JP | 2006-311768 A | 11/2006 |
| JP | 2007-089262 A | 4/2007 |
| JP | 2007-166875 A | 6/2007 |
| JP | 2007-202311 A | 8/2007 |
| JP | 2007-274843 A | 10/2007 |

* cited by examiner

*Primary Examiner* — Paul Ip
*Assistant Examiner* — Kawing Chan
(74) *Attorney, Agent, or Firm* — Kenyon & Kenyon LLP

(57) ABSTRACT

When a target operation point of either a motor MG1 or a motor MG2 is included in a resonance range specified by operation points of the motor MG1 or the motor MG2 in the occurrence of resonance in a booster converter, a hybrid vehicle controls the booster converter to make the voltage on the side of inverters approach to a preset target boosted voltage that is higher than the voltage on the side of the battery, while controlling the inverters by sine-wave control.

7 Claims, 9 Drawing Sheets

MOTOR DRIVE CONTROL APPARATUS, VEHICLE EQUIPPED WITH MOTOR DRIVE CONTROL APPARATUS, AND MOTOR DRIVE CONTROL METHOD

This application claims priority to Japanese Patent Application No. 2008-070099 filed 18 Mar. 2008, the content of which is incorporated herein by reference.

BACKGROUND OF THE INVENTION

1. Field of the Invention

The present invention relates to a motor drive control apparatus configured to drive and control a motor with a supply of electric power from a direct-current power source, as well as a vehicle equipped with such a motor drive control apparatus and a corresponding motor drive control method.

2. Description of the Related Art

One known structure of a motor drive device includes a booster converter equipped with a reactor and a switching element to boost a direct-current voltage supplied from a direct-current power source, an inverter configured to convert an output voltage of the booster converter into an alternating-current voltage and drive an alternating-current motor with the converted alternating-current voltage, and a controller configured to control the booster converter and the inverter (see, for example, Japanese Patent Laid-Open No. 2007-166875 and No. 2006-311768). The motor drive device of this known structure controls the inverter by selectively applying one of sine-wave PWM control of setting a modulation factor of voltage conversion by the inverter to a range of 0 to 0.61, overmodulation PWM control of setting the modulation factor to a range of 0.61 to 0.78, and rectangular-wave control of setting the modulation factor to a fixed value of 0.78. The motor drive device refers to the modulation factors of the inverter in the respective controls and adopts the sine-wave PWM control in a low rotation speed zone of the operation range of the alternating-current motor and the overmodulation PWM control in a middle rotation speed zone, and the rectangular-wave control in a high rotation speed zone. Such selective application of the control mode reduces a torque variation and allows the smooth output characteristic in the low rotation speed zone of the alternating-current motor, while enhancing the output of the alternating-current motor in the middle and high rotation speed zones.

The rectangular-wave control adopted in the motor drive device of the prior art structure has the lower control accuracy (the poorer control response) than the sine-wave PWM control. The rectangular-wave control, however, enhances the output of the alternating-current motor and improves the energy efficiency with prevention of a copper loss and a switching loss. Expansion of the application range of the rectangular-wave control in the operation range of the alternating-current motor is expected to improve the performance of the electric drive system including the alternating current motor and the energy efficiency. In the motor drive device of the prior art structure including the booster converter, smoothing capacitors are provided on both the direct-current power source side and the inverter side of the booster converter. The reactor of the booster converter and these smoothing capacitors constitute a resonance circuit. When the operation point of the alternating-current motor is included in a specific area, resonance of voltage or current occurs in the booster converter. In the expansion of the application range of the rectangular-wave control, the potential resonance of voltage or current occurring in the booster converter should be considered, in order to prevent overvoltage or overcurrent from being applied to or flowed through the booster converter and the smoothing capacitors.

SUMMARY OF THE INVENTION

In the motor drive control apparatus, the vehicle equipped with the motor drive control apparatus, and the motor drive control method, there would thus be a demand for ensuring sufficient power output from a motor and improving the energy efficiency, while preventing a potential trouble caused by occurrence of resonance in a voltage regulator, which is configured to regulate a voltage on the side of a motor drive circuit relative to a voltage on the side of a direct-current power source.

The present invention accomplishes at least part of the demand mentioned above and the other relevant demands by the following configurations applied to the motor drive control apparatus, the vehicle equipped with the motor drive control apparatus, and the motor drive control method.

According to one aspect, the invention is directed to a motor drive control apparatus configured to drive and control a motor with an supply of electric power from a direct-current power source. The motor drive control apparatus includes: a motor drive circuit configured to selectively apply one voltage between a PWM voltage and a rectangular-wave voltage and drive the motor with the selected voltage; a voltage regulator designed to have a reactor and a capacitor and configured to regulate a voltage on a side of the motor drive circuit relative to a voltage on a side of the direct-current power source; and a voltage controller configured to control the voltage regulator to make the voltage on the side of the motor drive circuit approach to a target voltage corresponding to a target operation point of the motor. When the target operation point of the motor is included in a resonance range specified by operation points of the motor in the occurrence of resonance in the voltage regulator, the voltage controller controls the voltage regulator to make the voltage on the side of the motor drive circuit approach to a preset target voltage that is higher than the voltage on the side of the direct-current power source. The motor drive control apparatus further has a drive circuit controller configured to select a control mode of the motor drive circuit between PWM control with the PWM voltage and rectangular-wave control with the rectangular-wave voltage in a state of non-regulating the voltage on the side of the motor drive circuit relative to the voltage on the side of the direct-current power source by the voltage regulator and in a state of regulating the voltage on the side of the motor drive circuit relative to the voltage on the side of the direct-current power source by the voltage regulator and to control the motor drive circuit by the selected control mode to ensure output of a target torque from the motor. When the target operation point of the motor is included in the resonance range, the drive circuit controller selects the PWM control for the control mode of the motor drive circuit and controls the motor drive circuit by the PWM control.

The motor drive control apparatus according to this aspect of the invention controls the voltage regulator to make the voltage on the side of the motor drive circuit approach to the target voltage corresponding to the target operation point of the motor. The motor drive control apparatus selects the control mode of the motor drive circuit between the PWM control with the PWM voltage and the rectangular-wave control with the rectangular-wave voltage in the state of non-regulating the voltage on the side of the motor drive circuit relative to the voltage on the side of the direct-current power source by the voltage regulator and in the state of regulating the voltage on the side of the motor drive circuit relative to the voltage on the side of the direct-current power source by the voltage regulator, and controls the motor drive circuit by the selected control mode to ensure output of the target torque from the motor. This arrangement expands the application range of the rectangular-wave control, which is generally adopted only in the state of regulating the voltage on the side of the motor drive circuit relative to the voltage on the side of the direct-current power source by the voltage regulator, to the state of non-regulating the voltage on the side of the motor drive circuit relative to the voltage on the side of the direct-current power source by the voltage regulator. Even in the event of reduction of the opportunities of boosting the voltage supplied from the direct-current power source by the voltage regulator, the expanded application range of the rectangular-wave control ensures the sufficient power output from the motor and accordingly improves the energy efficiency in the drive control of the motor. When the target operation point of the motor is included in the resonance range specified by the operation points of the motor in the occurrence of resonance in the voltage regulator, the motor drive control apparatus of the invention controls the voltage regulator to make the voltage on the side of the motor drive circuit approach to the preset target voltage that is higher than the voltage on the side of the direct-current power source, and controls the motor drive circuit by the PWM control. Namely the PWM control having the high control accuracy is adopted for the control mode of the motor drive circuit, when the target operation point of the motor is included in the resonance range. This arrangement ensures adequate control of the motor drive circuit and prevents any overvoltage or overcurrent from being applied to or being flowed through, for example, a booster converter or a smoothing capacitor. When the target operation point of the motor is included in the resonance range, the motor drive circuit may be controlled by the PWM control after an increase of, for example, a voltage to be supplied to the motor drive circuit. This arrangement ensures the sufficient power output from the motor even under application of the PWM control having a relatively small modulation factor. The motor drive control apparatus according to this aspect of the invention ensures the sufficient power output from the motor and improves the energy efficiency, while preventing a potential trouble, such as overvoltage or overcurrent, caused by the occurrence of resonance in the voltage regulator that is configured to regulate the voltage on the side of the motor drive circuit relative to the voltage on the side of the direct-current power source. The PWM control is preferably sine-wave PWM control or a combination of sine-wave PWM control and overmodulation PWM control.

In one preferable application of the motor drive control apparatus according to the above aspect of the invention, an operation range of the motor is divided in advance into a non-boosting zone where a voltage supplied from the direct-current power source is not boosted by the voltage regulator and a boosting zone where the voltage supplied from the direct-current power source is boosted by the voltage regulator. The resonance range may be made to be included in the boosting zone. The voltage controller may control the voltage regulator to boost a supply voltage, which is to be supplied to the motor drive circuit, to a target voltage corresponding to the target operation point of the motor when the target operation point of the motor is included in the boosting zone. The motor drive control apparatus of this application makes the resonance range included in the boosting zone after dividing the operation range of the motor into the non-boosting zone and the boosting zone. This arrangement readily and effectively prevents a potential trouble caused by the occurrence of resonance in the voltage regulator.

In another preferable application of the motor drive control apparatus according to the above aspect of the invention, the drive circuit controller determines the control mode of the motor drive circuit corresponding to at least one of the target operation point of the motor and a modulation factor of voltage conversion by the motor drive circuit with referring to a predetermined control mode setting restriction of defining a relation of the control mode of the motor drive circuit to at least one of the target operation point and the modulation factor, and controls the motor drive circuit by the determined control mode. This arrangement allows the adequate selection of the control mode of the motor drive circuit between the PWM control and the rectangular-wave control.

In one preferable embodiment of the invention, the motor drive control apparatus further has a resonance determination module configured to determine whether resonance over a preset degree occurs in the voltage regulator. Upon determination of the occurrence of the resonance over the preset degree in the voltage regulator by the resonance determination module, the voltage controller controls the voltage regulator to boost a supply voltage, which is to be supplied to the motor drive circuit, to a preset target voltage, and the drive circuit controller controls the motor drive circuit by the PWM control to ensure output of the target torque from the motor. This arrangement effectively prevents a potential trouble caused by the occurrence of resonance in the voltage regulator.

In one preferable application of the motor drive control apparatus of this embodiment, the resonance determination module determines the occurrence of resonance in the voltage regulator based on a maximum amplitude of the voltage on the side of the motor drive circuit. This arrangement allows precise detection of the occurrence of resonance.

According to another aspect, the invention is directed to another motor drive control apparatus configured to drive and control a motor with a supply of electric power from a direct-current power source. The motor drive control apparatus includes: a motor drive circuit configured to selectively apply one voltage between a sine-wave PWM voltage and a rectangular-wave voltage and drive the motor with the selected voltage; a voltage regulator designed to have a reactor and a capacitor and configured to regulate a voltage on a side of the motor drive circuit relative to a voltage on a side of the direct-current power source; a voltage controller configured to control the voltage regulator to make the voltage on the side of the motor drive circuit approach to a target voltage corresponding to a target operation point of the motor; and a drive circuit controller configured to select a control mode of the motor drive circuit between sine-wave PWM control with the sine-wave PWM voltage and rectangular-wave control with the rectangular-wave voltage in a state of non-boosting a voltage supplied from the direct-current power source by the voltage regulator and in a state of boosting the voltage supplied from the direct-current power source by the voltage regulator and to control the motor drive circuit by the selected control mode to ensure output of a target torque from the motor. When the target operation point of the motor enters a resonance range specified by operation points of the motor in the occurrence of resonance in the voltage regulator during control of the motor drive circuit by the rectangular-wave control in the state of non-boosting the voltage supplied from the direct-current power source by the voltage regulator, the drive circuit controller adopts the rectangular-wave control and controls the motor drive circuit by the rectangular-wave control with an increase in field weakening current. In response to allowance for a shift of the control mode of the motor drive circuit from the rectangular-wave control to the sine-wave PWM control, the drive circuit controller adopts the sine-wave PWM control and controls the motor drive circuit by the sine-wave PWM control.

The motor drive control apparatus according to this aspect of the invention controls the voltage regulator to make the voltage on the side of the motor drive circuit approach to the target voltage corresponding to the target operation point of the motor. The motor drive control apparatus selects the control mode of the motor drive circuit between the sine-wave PWM control with the sine-wave PWM voltage and the rectangular-wave control with the rectangular-wave voltage in the state of non-boosting the voltage supplied from the direct-current power source by the voltage regulator and in the state of boosting the voltage supplied from the direct-current power source by the voltage regulator, and controls the motor drive circuit by the selected control mode to ensure output of the target torque from the motor. This arrangement expands the application range of the rectangular-wave control, which is generally adopted only in the state of boosting the voltage supplied from the direct-current power source by the voltage regulator, to the state of non-boosting the voltage supplied from the direct-current power source by the voltage regulator. Even in the event of reduction of the opportunities of boosting the voltage supplied from the direct-current power source by the voltage regulator, the expanded application range of the rectangular-wave control ensures the sufficient power output from the motor and accordingly improves the energy efficiency in the drive control of the motor. When the target operation point of the motor enters the resonance range specified by the operation points of the motor in the occurrence of resonance in the voltage regulator during control of the motor drive circuit by the rectangular-wave control in the state of non-boosting the voltage supplied from the direct-current power source by the voltage regulator, the motor drive control apparatus of the invention adopts the rectangular-wave control and controls the motor drive circuit by the rectangular-wave control with an increase in field weakening current. In response to allowance for a shift of the control mode of the motor drive circuit from the rectangular-wave control to the sine-wave PWM control, the motor drive control apparatus adopts the sine-wave PWM control and controls the motor drive circuit by the sine-wave PWM control. When the target operation point of the motor enters the resonance range during the rectangular-wave control, the motor drive circuit is continuously controlled by the rectangular-wave control with an increase in field weakening current. Such control with the increased field weakening current effectively lowers the induced voltage of the motor (inter-terminal voltage) and allows a shift of the control mode to the sine-wave PWM control without requiring the voltage regulator to boost the voltage supplied from the direct-current power source. The control mode is shifted to the sine-wave PWM control at the time of a sufficient decrease of the induced voltage of the motor. This arrangement assures the sufficient power output from the motor, while ensuring adequate control of the motor drive circuit and preventing any overvoltage or overcurrent from being applied to or being flowed through, for example, a booster converter or a smoothing capacitor. The motor drive control apparatus according to this aspect of the invention also ensures the sufficient power output from the motor and improves the energy efficiency, while preventing a potential trouble, such as overvoltage or overcurrent, caused by the occurrence of resonance in the voltage regulator that is configured to regulate the voltage on the side of the motor drive circuit relative to the voltage on the side of the direct-current power source.

According to still another aspect, the invention is directed to another motor drive control apparatus configured to drive and control a motor with a supply of electric power from a direct-current power source. The motor drive control apparatus includes: a motor drive circuit configured to selectively apply one voltage between a PWM voltage and a rectangular-wave voltage and drive the motor with the selected voltage; a voltage regulator designed to have a reactor and a capacitor and configured to regulate a voltage on a side of the motor drive circuit relative to a voltage on a side of the direct-current power source; a voltage controller configured to control the voltage regulator to make the voltage on the side of the motor drive circuit approach to a target voltage corresponding to a target operation point of the motor; and a drive circuit controller configured to select a control mode of the motor drive circuit between PWM control with the PWM voltage and rectangular-wave control with the rectangular-wave voltage in a state of non-regulating the voltage on the side of the motor drive circuit relative to the voltage on the side of the direct-current power source by the voltage regulator and in a state of regulating the voltage on the side of the motor drive circuit relative to the voltage on the side of the direct-current power source by the voltage regulator and to control the motor drive circuit by the selected control mode to ensure output of a target torque from the motor. Parameters of the reactor and the capacitor are specified to cause a resonance range specified by operation points of the motor in the occurrence of resonance in the voltage regulator to be included in a PWM control area as part of an operation range of the motor. In the PWM control area, the voltage on the side of the motor drive circuit is not regulated relative to the voltage on the side of the direct-current power source by the voltage regulator, while the motor drive circuit is controlled under the PWM control by the drive circuit controller.

The motor drive control apparatus according to this aspect of the invention controls the voltage regulator to make the voltage on the side of the motor drive circuit approach to the target voltage corresponding to the target operation point of the motor. The motor drive control apparatus selects the control mode of the motor drive circuit between the PWM control with the PWM voltage and the rectangular-wave control with the rectangular-wave voltage in the state of non-regulating the voltage on the side of the motor drive circuit relative to the voltage on the side of the direct-current power source by the voltage regulator and in the state of regulating the voltage on the side of the motor drive circuit relative to the voltage on the side of the direct-current power source by the voltage regulator, and controls the motor drive circuit by the selected control mode to ensure output of the target torque from the motor. This arrangement expands the application range of the rectangular-wave control, which is generally adopted only in the state of regulating the voltage on the side of the motor drive circuit relative to the voltage on the side of the direct-current power source by the voltage regulator, to the state of non-regulating the voltage on the side of the motor drive circuit relative to the voltage on the side of the direct-current power source by the voltage regulator. Even in the event of reduction of the opportunities of boosting the voltage supplied from the direct-current power source by the voltage regulator, the expanded application range of the rectangular-wave control ensures the sufficient power output from the motor and accordingly improves the energy efficiency in the drive control of the motor. The motor drive control apparatus of the invention specifies the parameters of the reactor and the capacitor to cause the resonance range specified by the operation points of the motor in the occurrence of resonance in the voltage regulator to be included in the PWM control area as part of the operation range of the motor. In the PWM control area, the voltage on the side of the motor drive circuit is not regulated relative to the voltage on the side of the direct-current power source by the voltage regulator, while the motor drive circuit is controlled under the PWM control by the drive circuit controller. Such specification ensures the sufficient power output from the motor without requiring the voltage regulator to boost the voltage supplied from the direct-current power source, when the target operation point of the motor is included in the resonance range. Application of the PWM control having the high control accuracy ensures adequate control of the motor drive circuit and prevents any overvoltage or overcurrent from being applied to or being flowed through, for example, a booster converter or a smoothing capacitor. The motor drive control apparatus according to this aspect of the invention also ensures the sufficient power output from the motor and improves the energy efficiency, while preventing a potential trouble, such as overvoltage or overcurrent, caused by the occurrence of resonance in the voltage regulator that is configured to regulate the voltage on the side of the motor drive circuit relative to the voltage on the side of the direct-current power source.

One aspect of the invention is directed to a vehicle equipped with a motor driven and controlled with a supply of electric power from a direct-power source to output a driving power. The vehicle includes: a motor drive circuit configured to selectively apply one voltage between a PWM voltage and a rectangular-wave voltage and drive the motor with the selected voltage; a voltage regulator designed to have a reactor and a capacitor and configured to regulate a voltage on a side of the motor drive circuit relative to a voltage on a side of the direct-current power source; a voltage controller configured to control the voltage regulator to make the voltage on the side of the motor drive circuit approach to a target voltage corresponding to a target operation point of the motor. When the target operation point of the motor is included in a resonance range specified by operation points of the motor in the occurrence of resonance in the voltage regulator, the voltage controller controls the voltage regulator to make the voltage on the side of the motor drive circuit approach to a preset target voltage that is higher than the voltage on the side of the direct-current power source. The vehicle further has a drive circuit controller configured to select a control mode of the motor drive circuit between PWM control with the PWM voltage and rectangular-wave control with the rectangular-wave voltage in a state of non-regulating the voltage on the side of the motor drive circuit relative to the voltage on the side of the direct-current power source by the voltage regulator and in a state of regulating the voltage on the side of the motor drive circuit relative to the voltage on the side of the direct-current power source by the voltage regulator and to control the motor drive circuit by the selected control mode to ensure output of a target torque from the motor. When the target operation point of the motor is included in the resonance range, the drive circuit controller selects the PWM control for the control mode of the motor drive circuit and controls the motor drive circuit by the PWM control. The vehicle according to this aspect of the invention has the similar functions and effects to those of the motor drive control apparatus having any of the arrangements discussed above.

Another aspect of the invention is directed to a motor drive control method of driving and controlling a motor by utilizing a direct-current power source, a motor drive circuit configured to selectively apply one voltage between a PWM voltage and a rectangular-wave voltage and drive the motor with the selected voltage, and a voltage regulator designed to have a reactor and a capacitor and configured to regulate a voltage on a side of the motor drive circuit relative to a voltage on a side of the direct-current power source. The motor drive control method controls the voltage regulator to make the voltage on the side of the motor drive circuit approach to a target voltage corresponding to a target operation point of the motor. When the target operation point of the motor is included in a resonance range specified by operation points of the motor in the occurrence of resonance in the voltage regulator, the motor drive control method controls the voltage regulator to make the voltage on the side of the motor drive circuit approach to a preset target voltage that is higher than the voltage on the side of the direct-current power source. The motor drive control method selects a control mode of the motor drive circuit between PWM control with the PWM voltage and rectangular-wave control with the rectangular-wave voltage in a state of non-regulating the voltage on the side of the motor drive circuit relative to the voltage on the side of the direct-current power source by the voltage regulator and in a state of regulating the voltage on the side of the motor drive circuit relative to the voltage on the side of the direct-current power source by the voltage regulator and controls the motor drive circuit in the selected control method to ensure output of a target torque from the motor. When the target operation point of the motor is included in the resonance range, the motor drive control method selects the PWM control for the control mode of the motor drive circuit and controls the motor drive circuit by the PWM control.

The motor drive control method according to this aspect of the invention ensures the sufficient power output from the motor and improves the energy efficiency, while preventing a potential trouble, such as overvoltage or overcurrent, caused by the occurrence of resonance in the voltage regulator that is configured to regulate the voltage on the side of the motor drive circuit relative to the voltage on the side of the direct-current power source.

Another aspect of the invention is directed to another motor drive control method of driving and controlling a motor by utilizing a direct-current power source, a motor drive circuit configured to selectively apply one voltage between a sine-wave PWM voltage and a rectangular-wave voltage and drive the motor with the selected voltage, and a voltage regulator designed to have a reactor and a capacitor and configured to regulate a voltage on a side of the motor drive circuit relative to a voltage on a side of the direct-current power source. The motor drive control method selects a control mode of the motor drive circuit between sine-wave PWM control with the sine-wave PWM voltage and rectangular-wave control with the rectangular-wave voltage in a state of non-boosting a voltage supplied from the direct-current power source by the voltage regulator and in a state of boosting the voltage supplied from the direct-current power source by the voltage regulator and controls the motor drive circuit by the selected control mode to ensure output of a target torque from the motor. When a target operation point of the motor enters a resonance range specified by operation points of the motor in the occurrence of resonance in the voltage regulator during control of the motor drive circuit by the rectangular-wave control in the state of non-boosting the voltage supplied from the direct-current power source by the voltage regulator, the motor drive control method adopts the rectangular-wave control and controls the motor drive circuit by the rectangular-wave control with an increase in field weakening current. The motor drive control method adopts the sine-wave PWM control and controls the motor drive circuit by the sine-wave PWM control in response to allowance for a shift of the control mode of the motor drive circuit from the rectangular-wave control to the sine-wave PWM control.

The motor drive control method according to this aspect of the invention also ensures the sufficient power output from the motor and improves the energy efficiency, while preventing a potential trouble, such as overvoltage or overcurrent, caused by the occurrence of resonance in the voltage regulator that is configured to regulate the voltage on the side of the motor drive circuit relative to the voltage on the side of the direct-current power source.

DESCRIPTION OF THE PREFERRED EMBODIMENTS

Some modes of carrying out the invention are described below as a preferred embodiment and its modified examples with reference to the accompanied drawings.

Figure 1:
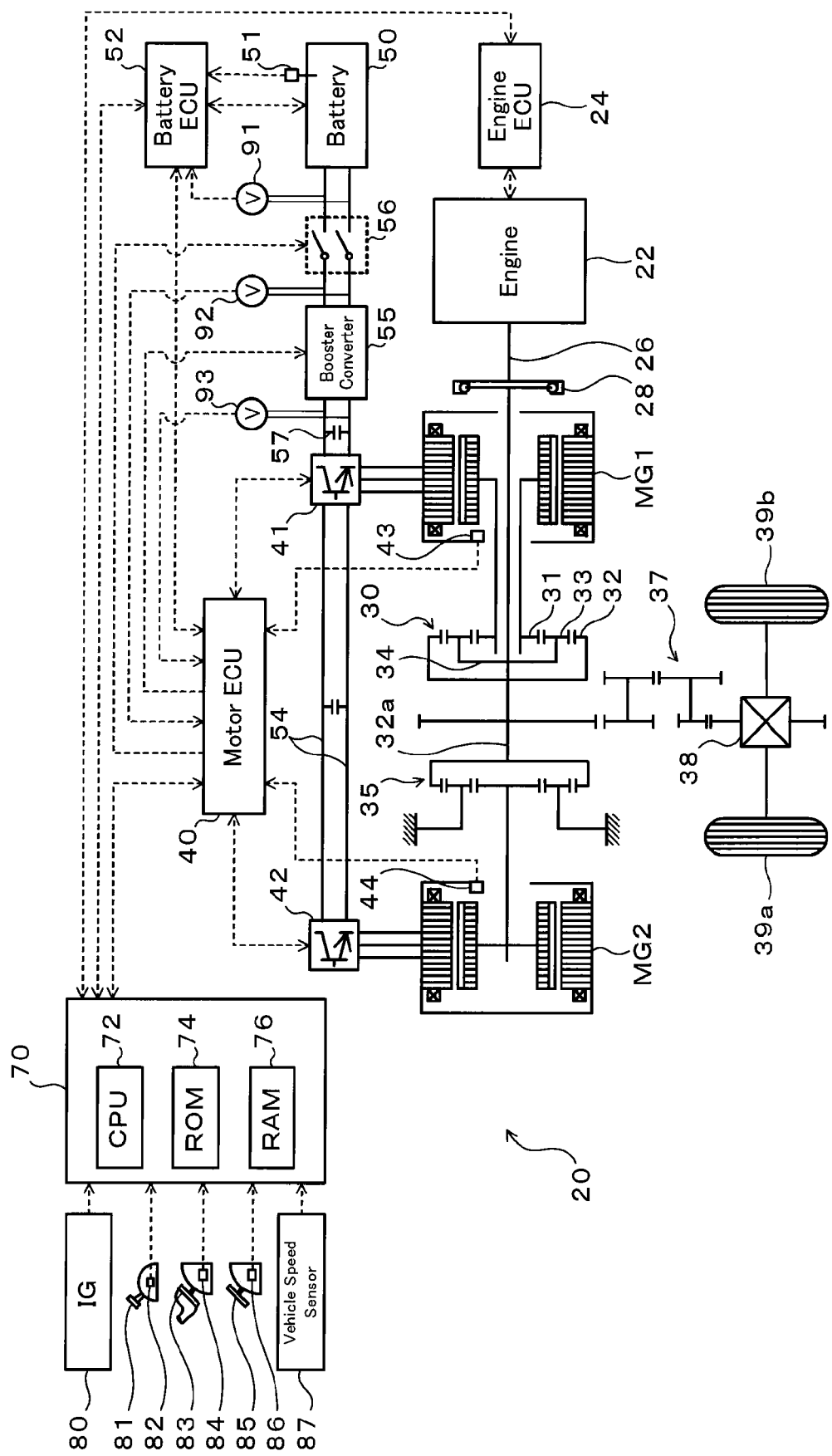
FIG. 1 schematically illustrates the configuration of a hybrid vehicle in one embodiment of the invention.
Figure 2:
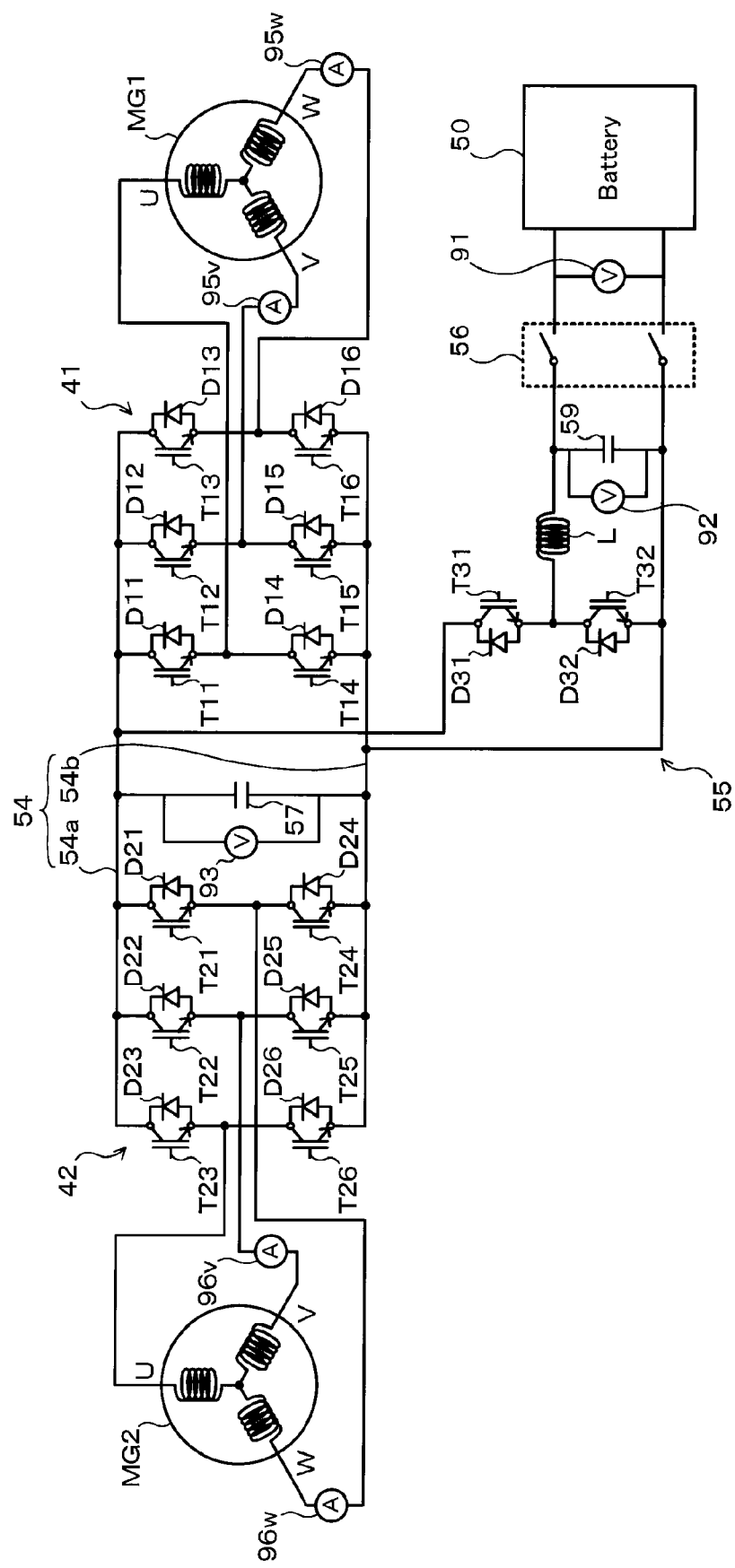
FIG. 2 shows the schematic structure of an electric drive system including motors MG1 and MG2 in the hybrid vehicle of the embodiment.

FIG. 1 schematically illustrates the configuration of a hybrid vehicle 20 in one embodiment of the invention. FIG. 2 shows the schematic structure of an electric drive system included in the hybrid vehicle 20. As illustrated, the hybrid vehicle 20 of the embodiment includes an engine 22, a three shaft-type power distribution integration mechanism 30 connected via a damper 28 to a crankshaft 26 or an output shaft of the engine 22, a motor MG1 connected with the power distribution integration mechanism 30 and designed to have power generation capability, a reduction gear 35 attached to a ring gear shaft 32a as an axle linked with the power distribution integration mechanism 30, a motor MG2 connected to the ring gear shaft 32a via the reduction gear 35, inverters 41 and 42 arranged to convert direct-current power into alternating-current power and supply the alternating-current power to the motors MG1 and MG2, a booster converter 55 configured to convert the voltage of electric power output from a battery 50 and supply the converted voltage to the inverters 41 and 42, and a hybrid electronic control unit 70 (hereafter referred to as hybrid ECU) configured to control the operations of the whole hybrid vehicle 20.

The engine 22 is constructed as an internal combustion engine designed to consume a hydrocarbon fuel, such as gasoline or light oil, and generate power. The engine 22 is under operation controls, such as fuel injection control, ignition timing control, and intake air flow control, of an engine electronic control unit 24 (hereafter referred to as engine ECU) The engine ECU 24 inputs diverse signals from various sensors provided for the engine 22 to measure and detect the operating conditions of the engine 22. The engine ECU 24 establishes communication with the hybrid ECU 70 to control the operations of the engine 22 in response to control signals from the hybrid ECU 70 with reference to the diverse signals from the various sensors and to output data regarding the operating conditions of the engine 22 to the hybrid ECU 70 according to the requirements.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 as the rotational elements of differential motions. The carrier 34 as the engine-side rotational element, the sun gear 31, and the ring gear 32 as the axle-side rotational element in the power distribution integration mechanism 30 are respectively linked to the crankshaft 26 of the engine 22, to the motor MG1, and to the reduction gear 35 via the ring gear shaft 32a. When the motor MG1 functions as a generator, the power distribution integration mechanism 30 distributes the power of the engine 22 input via the carrier 34 into the sun gear 31 and the ring gear 32 corresponding to their gear ratio. When the motor MG1 functions as a motor, on the other hand, the power distribution integration mechanism 30 integrates the power of the engine 22 input via the carrier 34 with the power of the motor MG1 input via the sun gear 31 and outputs the integrated power to the ring gear 32. The power output to the ring gear 32 is transmitted from the ring gear shaft 32a through a gear mechanism 37 and a differential gear 38 and is eventually output to drive wheels 39a and 39b of the hybrid vehicle 20.

The motors MG1 and MG2 are constructed as synchronous generator motors having a rotor with permanent magnets embedded therein and a stator with three-phase coils wounded thereon. The motors MG1 and MG2 transmit electric power to and from the battery 50 as a direct-current power source via the inverters 41 and 42. As shown in FIG. 2, the inverters 41 and 42 respectively have six transistors T11 through T16 and T21 through T26 and six diodes D11 through D16 and D21 through D26 arranged in parallel with but in an opposite direction to the corresponding transistors T11 through T16 and T21 through T26. The transistors T11 through T16 and T21 through T26 are arranged in pairs such that two transistors in each pair respectively function as a source and a sink to a common positive bus 54a and a common negative bus 54b shared as power lines 54 by the inverters 41 and 42. The individual phases of the three-phase coils (U phase, V phase, and W phase) in each of the motors MG1 and MG2 are connected to respective connection points of the three paired transistors. Controlling the rate of an on-time of the paired transistors T11 through T16 or T21 through T26 in the state of voltage application between the positive bus 54a and the negative bus 54b results in generating a revolving magnetic field on the three-phase coils to drive and rotate the motor MG1 or the motor MG2. The inverters 41 and 42 share the positive bus 54a and the negative bus 54b as mentioned above. Such connection enables electric power generated by one of the motors MG1 and MG2 to be consumed by the other motor MG2 or MG1. A smoothing capacitor 57 is connected between the positive bus 54a and the negative bus 54b to smooth the voltage.

The booster converter 55 is connected with the battery 50 via a system main relay 56 and has a transistor T31 (upper arm) and a transistor T32 (lower arm), two diodes D31 and D32 arranged in parallel with but in an opposite direction to the two transistors T31 and T32, and a reactor L. The two transistors T31 and T32 are respectively connected to the positive bus 54a and the negative bus 54b of the inverters 41 and 42, and the reactor L is connected at a connection point of the two transistors T31 and T32. A positive terminal and a negative terminal of the battery 50 are respectively connected via the system main relay 56 to the reactor L and to the negative bus 54b. A smoothing capacitor 59 is also connected between the reactor L and the negative bus 54b to smooth the voltage on the side of the battery 50 in the booster converter 55. A second voltage sensor 92 is provided between terminals of the smoothing capacitor 59. An original voltage level or a pre-boost voltage VL (voltage on the side of the direct-current power source) in the booster converter 55 is obtained from a detection result of the second voltage sensor 92. Switching control of the transistors T31 and T32 boosts the voltage of the direct-current power (pre-boost voltage VL) from the battery 50 and supplies the boosted voltage to the inverters 41 and 42. A boosted voltage VH (voltage on the side of the motor drive circuit) in the booster converter 55 to be supplied to the inverters 41 and 42 is obtained from a detection result of a third voltage sensor 93 provided between terminals of the smoothing capacitor 57. Switching control of the transistors T31 and T32 in the booster converter 55 steps down the direct-current voltage applied to the positive bus 54a and the negative bus 54b to charge the battery 50.

The inverters 41 and 42 and the booster converter 55 are under control of a motor electronic control unit 40 (hereafter referred to as 'motor ECU') to drive and control the motors MG1 and MG2. The motor ECU 40 inputs various signals required for driving and controlling the motors MG1 and MG2, for example, signals representing rotational positions of rotors in the motors MG1 and MG2 from rotational position detection sensors 43 and 44, signals representing the pre-boost voltage VL from the second voltage sensor 92 and the boosted voltage VH from the third voltage sensor 93, and signals representing phase currents to be applied to the motors MG1 and MG2 from current sensors 95v, 95w, 96v, and 96w (see FIG. 2). The motor ECU 40 outputs switching control signals to the inverters 41 and 42, a driving signal to the system main relay 56, and a switching control signal to the booster converter 55. The motor ECU 40 establishes communication with a battery electronic control unit 52 (discussed later, hereafter referred to as battery ECU) and the hybrid ECU 70 to drive and control the motors MG1 and MG2 in response to control signals received from the hybrid ECU 70 and signals received from the battery ECU 52 with reference to the signals from the sensors. The motor ECU 40 computes and obtains data regarding the operating conditions of the motors MG1 and MG2, for example, computing rotation speeds Nm1 and Nm2 of the motors MG1 and MG2 from the signals of the rotational position detection sensors 43 and 44, and outputs the computed and obtained data to the hybrid ECU 70 or other relevant elements according to the requirements.

The battery 50, a nickel hydrogen battery or a lithium ion battery in this embodiment, is under control and management of the battery ECU 52. The battery ECU 52 inputs various signals required for management and control of the battery 50, for example, an inter-terminal voltage VB from a first voltage sensor 91 provided between terminals of the battery 50, a charge-discharge current from a current sensor (not shown) located in the power line 54 connecting with the output terminal of the battery 50, and a battery temperature Tb from a temperature sensor 51 attached to the battery 50. The battery ECU 52 outputs data regarding the operating conditions of the battery 50 by communication to the hybrid ECU 70 and the engine ECU 24 according to the requirements. The battery ECU 52 also performs various arithmetic operations for management and control of the battery 50. A remaining charge or state of charge SOC of the battery 50 is calculated from an integrated value of the charge-discharge current measured by the current sensor. A charge-discharge power demand Pb* of the battery 50 is set based on the calculated state of charge SOC of the battery 50. An input limit Win as an allowable charging electric power to be charged in the battery 50 and an output limit Wout as an allowable discharging electric power to be discharged from the battery 50 are set corresponding to the calculated state of charge SOC and the battery temperature Tb. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the state of charge SOC of the battery 50, and multiplies the base values of the input limit Win and the output limit Wout by the specified input limit correction factor and output limit correction factor to determine the input limit Win and the output limit Wout of the battery 50.

The hybrid ECU 70 is constructed as a microprocessor including a CPU 72, a ROM 74 configured to store processing programs, a RAM 76 configured to temporarily store data, input and output ports (not shown), and a communication port (not shown). The hybrid ECU 70 inputs, via its input port, an ignition signal from an ignition switch (start switch) 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal stroke BS or the driver's depression amount of a brake pedal 85 from a brake pedal stroke sensor 86, and a vehicle speed V from a vehicle speed sensor 87. The hybrid ECU 70 makes connection with the engine ECU 24, the motor ECU 40, and the battery ECU 52 via its communication port to transmit various control signals and data to and from the engine ECU 24, the motor ECU 40, and the battery ECU 52 as mentioned previously.

During a drive of the hybrid vehicle 20, the hybrid ECU 70 computes a torque demand Tr*, which is to be output to the ring gear shaft 32a as the axle, from the vehicle speed V and the accelerator opening Acc corresponding to the driver's depression amount of the accelerator pedal 83, and sets a target rotation speed Ne* and a target torque Te* of the engine 22, a torque command Tm1* or a target torque of the motor MG1, and a torque command Tm2* or a target torque of the motor MG2 to ensure output of a torque equivalent to the computed torque demand Tr* to the ring gear shaft 32a. The hybrid vehicle 20 of the embodiment has several drive control modes of the engine 22 and the motors MG1 and MG2 including a torque conversion drive mode, a charge-discharge drive mode, and a motor drive mode. In the torque conversion drive mode, the hybrid ECU 70 sets the target rotation speed Ne* and the target torque Te* of the engine 22 to ensure output of a power from the engine 22 that is equivalent to the torque demand Tr*, while setting the torque commands Tm1* and Tm2* of the motors MG1 and MG2 to enable all the output power of the engine 22 to be subjected to torque conversion by the power distribution integration mechanism 30 and the motors MG1 and MG2 and to be output to the ring gear shaft 32a. In the charge-discharge drive mode, the hybrid ECU 70 sets the target rotation speed Ne* and the target torque Te* of the engine 22 to ensure output of a power from the engine 22 that is equivalent to the sum of the torque demand Tr* and a charge-discharge power demand Pb* to be charged into or discharged from the battery 50, while setting the torque commands Tm1* and Tm2* of the motors MG1 and MG2 to enable all or part of the output power of the engine 22 with charge or discharge of the battery 50 to be subjected to torque conversion by the power distribution integration mechanism 30 and the motors MG1 and MG2 and to ensure output of a torque equivalent to the torque demand Tr* to the ring gear shaft 32a. In the motor drive mode, the hybrid ECU 70 stops the operation of the engine 22 and controls the motor MG2 to output a torque equivalent to the torque demand Tr* to the ring gear shaft 32a. In this case, the hybrid ECU 70 sets 0 to the target rotation speed Ne* and the target torque Te* of the engine 22 and the torque command Tm1* of the motor MG1 and sets the torque command Tm2* of the motor MG2 based on the torque demand Tr*, a gear ratio ρ of the power distribution integration mechanism 30, and a gear ratio Gr of the reduction gear 35.

After setting the target rotation speed Ne* and the target torque Te* of the engine 22 and the torque commands Tm1* and Tm2* of the motors MG1 and MG2, the hybrid ECU 70 sends the settings of the target rotation speed Ne* and the target torque Te* of the engine 22 to the engine ECU 24 and the settings of the torque commands Tm1* and Tm2* of the motors MG1 and MG2 to the motor ECU 40. The engine ECU 24 controls the engine 22 to be drive at a drive point defined by the target rotation speed Ne* and the target torque Te* received from the hybrid ECU 70. The motor ECU 40 performs switching control of the inverters 41 and 42 to respectively drive the motor MG1 and the motor MG2 with the torque command Tm1* and with the torque command Tm2* received from the hybrid ECU 70. In the configuration of the embodiment, the motor ECU 40 adopts one of three controls for switching control of the inverters 41 and 42, sine-wave PWM control with a sine-wave PWM voltage, overmodulation PWM control with an overmodulation PWM voltage, and rectangular-wave control with a rectangular-wave voltage, based on the torque commands Tm1* and Tm2* and the rotation speeds Nm1 and Nm2 of the motors MG1 and MG2. The sine-wave PWM control is generally referred to as 'PWM control' and controls on and off the transistors T11 through T16 and the transistors T21 through T26 according to a voltage difference between a voltage command value in a sinusoidal waveform and a voltage of a triangular wave or another carrier wave to obtain an output voltage (PWM voltage) having a sinusoidal fundamental wave component. In the sine-wave PWM control, a modulation factor Kmd as a ratio of the output voltage (the amplitude of the fundamental wave component) to the boosted voltage VH (inverter input voltage) supplied from the booster converter 55 (the smoothing capacitor 57) is set approximately in a range of 0 to 0.61. The overmodulation PWM control distorts the carrier wave to reduce the amplitude of the carrier wave and then performs the control of the sine-wave PWM control. In the overmodulation PWM control, the modulation factor Kmd is set approximately in a range of 0.61 to 0.78. The rectangular-wave control theoretically generates a fundamental wave component having a maximum amplitude and controls the motor torque by varying the phase of a rectangular voltage having a fixed amplitude according to the torque command. In the rectangular-wave control, the modulation factor Kmd is kept at a substantially constant value (approximately equal to 0.78). The control accuracy (control response) of the inverters 41 and 42 (the motors MG1 and MG2) decreases in the sequence of the sine-wave PWM control, the overmodulation PWM control, and the rectangular-wave control. The rectangular-wave control enhances the voltage utilization of the direct-current power source and prevents a copper loss and a switching loss to improve the energy efficiency. In a high-speed rotation zone with the high rotation speeds of the motors MG1 and MG2, the rectangular-wave control is basically adopted for the switching control. In this case, field weakening control is performed to supply field weakening current and make the boosted voltage VH, which is to be supplied to the inverters 41 and 42, higher than an induced voltage generated in the motors MG1 and MG2. In the hybrid vehicle 20 of the embodiment, the motor ECU 40 controls the booster converter 55 to boost a rated voltage of the battery 50 (for example, DC288V) to a predetermined voltage level (for example, 650 V at the maximum) according to a target operation point of the motor MG1 or MG2 (specified by the torque command Tm1* or Tm2* and the rotation speed Nm1 or Nm2).

Figure 3:
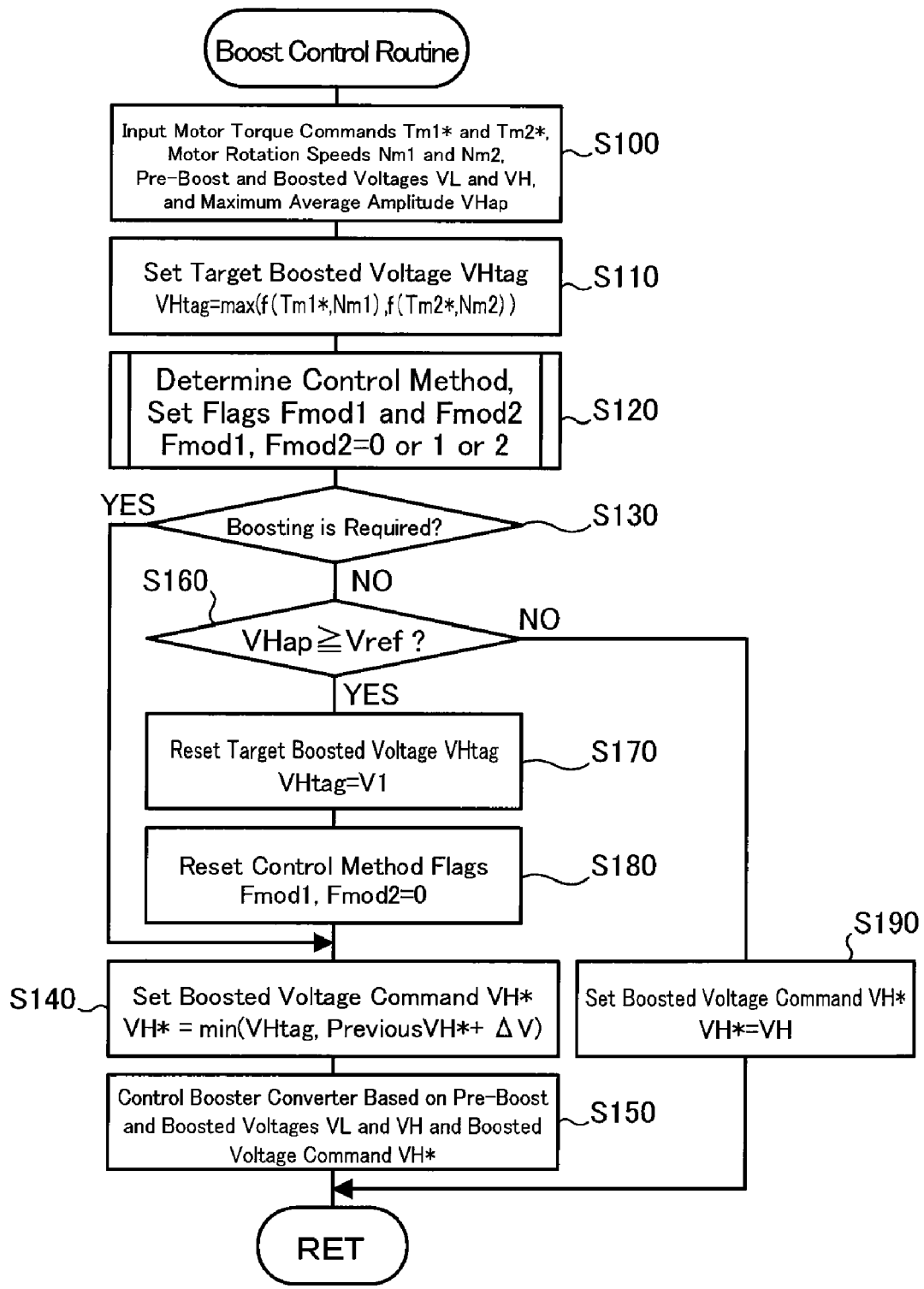
FIG. 3 is a flowchart showing a boost control routine executed by a motor ECU in the hybrid vehicle of the embodiment.

The control of the booster converter 55 and the inverters 41 and 42 performed by the motor ECU 40 in the hybrid vehicle 20 of the embodiment is described in detail below. FIG. 3 is a flowchart showing a boost control routine executed by the motor ECU 40 at preset time intervals in the embodiment.

In the boost control routine of FIG. 3, a CPU (not shown) of the motor ECU 40 first inputs data required for control, that is, the torque commands Tm1* and Tm2* of the motors MG1 and MG2 set by the hybrid ECU 70, the current rotation speeds Nm1 and Nm2 of the motors MG1 and MG2, the pre-boost voltage VL, the boosted voltage VH, and a maximum average amplitude VHap of the boosted voltage VH (step S100). The maximum average amplitude VHap of the boosted voltage VH is obtained by averaging several sampling data of the maximum amplitude of the boosted voltage VH sampled by the third voltage sensor 93. After the data input at step S100, the CPU refers to target boosted voltage setting maps provided in advance for the respective motors MG1 and MG2 and stored in a storage unit (not shown) of the motor ECU 40 and sets a target boosted voltage VHtag as a target value of the boosted voltage VH according to the driving condition of the hybrid vehicle 20, based on the torque commands Tm1* and Tm2* of the motors MG1 and MG2 and the current rotation speeds Nm1 and Nm2 of the motors MG1 and MG2 (step S110). In this embodiment, the greater between a value corresponding to the target operation point of the motor MG1 (specified by the torque command Tm1* and the current rotation speed Nm1) read from the target boosted voltage setting map for the motor MG1 and a value corresponding to the target operation point of the motor MG2 (specified by the torque command Tm2* and the current rotation speed Nm2) read from the target boosted voltage setting map for the motor MG2 is set to the target boosted voltage VHtag.

Figure 4:
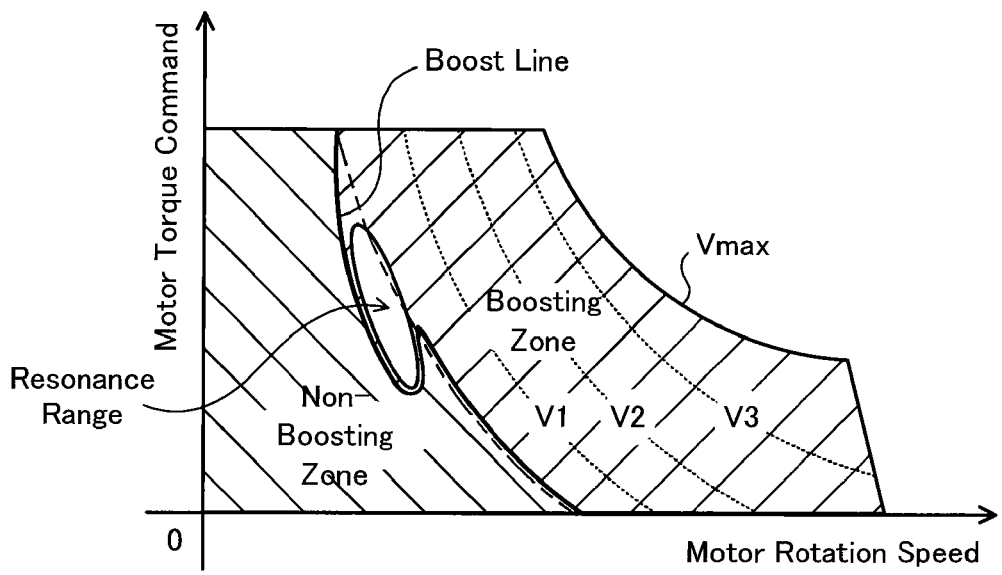
FIG. 4 shows one example of a target boosted voltage setting map.

FIG. 4 shows one example of the target boosted voltage setting map. This illustrated example shows a first quadrant of the target boosted voltage setting map, that is, an area having positive values for both the motor torque command and the motor rotation speed. As clearly understood from FIG. 4, the target boosted voltage setting map is designed to divide the operation range of the motor MG1 or MG2 into a non-boosting zone where the pre-boost voltage VL on the side of the battery 50 is not boosted by the booster converter 55 and a boosting zone where the pre-boost voltage VL is boosted by the booster converter 55. A concrete procedure of creating the target boosted voltage setting map in the embodiment first specifies an essential area in the operation range of the motor MG1 or MG2 that absolutely requires boosting the pre-boost voltage VL on the side of the battery 50 to ensure output of a torque equivalent to the torque command Tm1* or Tm2* from the motor MG1 or MG2. The procedure subsequently compares the efficiency of the electric drive system including the motors MG1 and MG2, the inverters 41 and 42, the battery 50, and the booster converter 55 in the state of non-boosting the pre-boost voltage VL on the side of the battery 50 by the booster converter 55 with the efficiency in the state of boosting the pre-boost voltage VL on the side of the battery 50 by the booster converter 55 with regard to each operation point of the motor MG1 or MG2 (defined by the motor torque command and the motor rotation speed) out of the essential area. The procedure then sets each operation point having the higher efficiency in the non-boosting state than the efficiency in the boosting state to the non-boosting zone, while setting each operation point having the higher efficiency in the boosting state than the efficiency in the non-boosting state to the boosting zone. A borderline shown by a two-dot chain line in FIG. 4 defines the area having lower absolute values of the motor rotation speed as the non-boosting zone and the area having higher absolute values of the motor rotation speed as the boosting zone. As shown in FIG. 4, equal voltage lines V1 to V3 are specified between the rated voltage of the battery 50 and a maximum value Vmax of the boosted voltage VH, based on the induced voltages of the respective operation points in the boosting zone and the values of the modulation factor Kmd in the adopted control methods of the inverters 41 and 42. The target boosted voltage VHtag of each operation point included in the boosting zone is determined in advance by linear interpolation of the rated voltage of the battery 50, the equal voltage lines V1 to V3, and the maximum value Vmax of the boosted voltage VH. A fixed value smaller than the value of the target boosted voltage VHtag in the boosting zone, for example, the rated voltage of the battery 50, is set to the target boosted voltage VHtag in the non-boosting zone.

In the hybrid vehicle 20 of the embodiment, the smoothing capacitors 57 and 59 are provided respectively between the terminals of the booster converter 55 on the side of the inverters 41 and 42 and between the terminals of the booster converter 55 on the side of the battery 50. The reactor L of the booster converter 55 and the smoothing capacitors 57 and 59 constitute a resonance circuit. There is resonance of voltage or current in the booster converter 55 when the operation point of the motor MG1 or MG2 is included in a specific area. In the hybrid vehicle 20 of the embodiment, the specific area including the operation points of the motor MG1 or MG2 in the occurrence of resonance in the booster converter 55 is specified in advance as a resonance range by experiments and analyses. The target boosted voltage setting map is created in such a manner that the resonance range is specified to be included in the boosting zone as shown in FIG. 4. In the illustrated example of FIG. 4, the resonance range is present in the vicinity of the borderline (the two-dot chain line in FIG. 4) between the non-boosting zone and the boosting zone determined according to the efficiency of the electric drive system. In this case, a boost line given as the borderline between the non-boosting zone and the boosting zone is extended into the non-boosting zone to specify the resonance range to be included in the boosting zone. The target boosted voltage VHtag in the resonance range included in the boosting zone is determined, based on the torques and the induced voltages corresponding to the operation points included in the resonance range and the values of the modulation factor Kmd in the adopted control methods of the inverters 41 and 42 when the target operation point of the motor MG1 or MG2 is included in the resonance range. The boost line used for shift from the non-boosting zone to the boosting zone may be identical with the boost line used for shift from the boosting zone to the non-boosting zone. There may, however, be a certain hysteresis set between the two boost lines to allow the shift from the boosting zone to the non-boosting zone in an area of lower motor rotation speed than the shift from the non-boosting zone to the boosting zone.

After setting the target boosted voltage VHtag at step S110 as described above, the CPU refers to control method setting maps provided in advance for the respective motors MG1 and MG2 and stored in the storage unit (not shown) of the motor ECU 40 and sets the control method to be adopted for control of the inverter 41 corresponding to the motor MG1 and the control method to be adopted for control of the inverter 42 corresponding to the motor MG2, based on the torque commands Tm1* and Tm2* of the motors MG1 and MG2 and the current rotation speeds Nm1 and Nm2 of the motors MG1 and MG2 (step S120). At step S120, the CPU also sets control method flags Fmod1 and Fmod2 to represent the control methods respectively determined for the motor MG1 and for the motor MG2, the sine-wave PWM control, overmodulation PWM control, or the rectangular-wave control. The control method for the motor MG1 is set corresponding to the target operation point of the motor MG1 (defined by the torque command Tm1* and the current rotation speed Nm1) by referring to the control method setting map provided for the motor MG1. The control method flag Fmod1 is set equal to 0 corresponding to the setting of the sine-wave PWM control for the control method, is set equal to 1 corresponding to the setting of the overmodulation PWM control for the control method, and is set equal to 2 corresponding to the setting of the rectangular-wave control for the control method. Similarly the control method for the motor MG2 is set corresponding to the target operation point of the motor MG2 (defined by the torque command Tm2* and the current rotation speed Nm2) by referring to the control method setting map provided for the motor MG2. The control method flag Fmod2 is set equal to 0 corresponding to the setting of the sine-wave PWM control for the control method, is set equal to 1 corresponding to the setting of the overmodulation PWM control for the control method, and is set equal to 2 corresponding to the setting of the rectangular-wave control for the control method.

Figure 5:
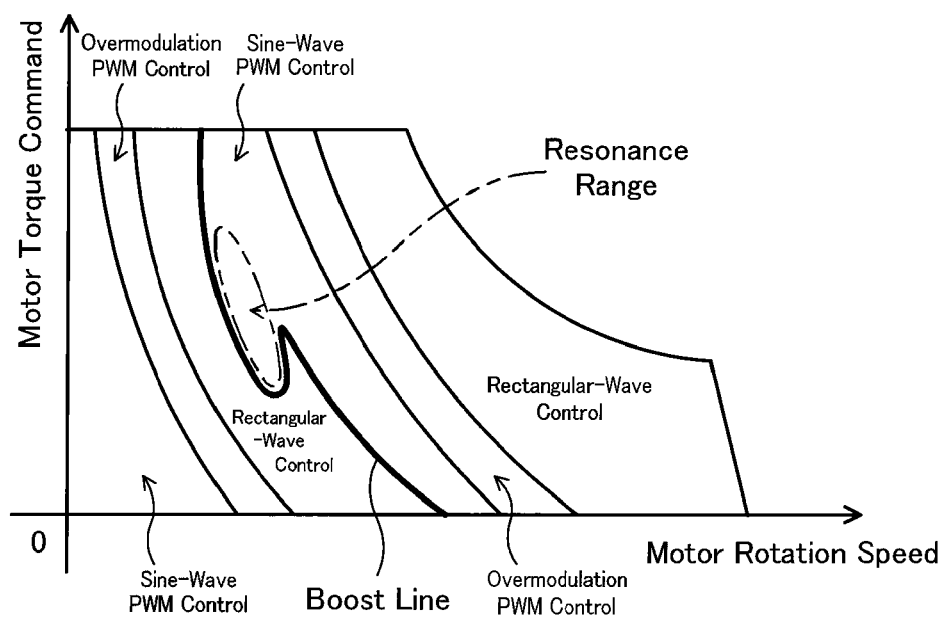
FIG. 5 shows one example of a control method setting map.

FIG. 5 shows one example of the control method setting map. This illustrated example shows a first quadrant of the control method setting map, that is, an area having positive values for both the motor torque command and the motor rotation speed. As clearly understood from FIG. 5, the control method setting map is correlated to the target boosted voltage setting map and is designed to divide the operation range of the motor MG1 or MG2 into an area of the sine-wave PWM control, an area of the overmodulation PWM control, and an area of the rectangular-wave control. In the embodiment, each of the non-boosting zone and the boosting zone parted by the boost line is divided into an area of the sine-wave PWM control, an area of the overmodulation PWM control, and an area of the rectangular-wave control basically in the increasing sequence of the motor rotation speed. In the hybrid vehicle 20 of the embodiment, the sine-wave PWM control, the overmodulation PWM control, and the rectangular-wave control are selectively applied for the control methods of the inverters 41 and 42 in the state of non-boosting the pre-boost voltage VL on the side of the battery 50 by the booster converter 55 and in the state of boosting the pre-boost voltage VL on the side of the battery 50 by the booster converter 55. The inverters 41 and 42 are then controlled by the selected control methods to ensure output of torques equivalent to torque commands Tm1* and Tm2* from the motors MG1 and MG2. This expands the application range of the rectangular-wave control, which is generally adopted only in the state of boosting the pre-boost voltage VL on the side of the battery 50 by the booster converter 55, to the state of non-boosting the pre-boost voltage VL on the side of the battery 50 by the booster converter 55. Even in the event of reduction of the opportunities of boosting the pre-boost voltage VL on the side of the battery 50 by the booster converter 55, the expanded application range of the rectangular-wave control ensures the sufficient power outputs of the motors MG1 and MG2 and thereby desirably improves the energy efficiency in the drive control of the motors MG1 and MG2. As shown in FIG. 5, the control method setting map of the embodiment is designed to adopt the sine-wave PWM control for the control method in the resonance range as the specific area specified by the operation points of the motor MG1 or MG2 in the occurrence of resonance in the booster converter 55 and to adopt the sine-wave PWM control for the control method in a certain area including the target operation point of the other of the motors MG1 and MG2 when the target operation point of one of the motors MG1 and MG2 is included in the resonance range.

After setting the control methods for the motor MG1 and for the motor MG2 at step S120, the CPU determines the requirement or non-requirement for boosting the pre-boost voltage VL on the side of the battery 50 by the booster converter 55, for example, based on the result of comparison between the target boosted voltage VHtag set at step S110 and the pre-boost voltage VL input at step S100 (step S130). Upon the requirement for boosting the pre-boost voltage VL on the side of the battery 50 at step S130, the smaller between the target boosted voltage VHtag and the sum of a previous value of a boosted voltage command VH* set in a previous cycle of this routine and a predetermined boost rate $\Delta V$ is set to a current value of the boosted voltage command VH* (step S140). The boost rate $\Delta V$ represents a variation in voltage per unit time dt in the process of stepping up the boosted voltage VH to the target boosted voltage VHtag. The boost rate $\Delta V$ may be a fixed value or a variable value. The CPU then performs switching control of the transistors T31 and T31 of the booster converter 55 to make the boosted voltage VH approach to the boosted voltage command VH*, based on the set boosted voltage command VH* and the pre-boost voltage VL and the boosted voltage VH input at step S100 (step S150). After the switching control, the boost control routine returns to repeat the series of processing of and after step S100. In the hybrid vehicle 20 of the embodiment, when the target operation point of the motor MG1 or MG2 (defined by the motor torque command and the motor rotation speed) is included in the resonance range as the specific area specified by the operation points of the motor MG1 or MG2 in the occurrence of resonance in the booster converter 55, the procedure controls the booster converter 55 to step up the boosted voltage VH, which is to be supplied to the inverters 41 and 42, to the target boosted voltage VHtag, while adopting the sine-wave PWM control for the control methods of the inverters 41 and 42.

Upon no requirement for boosting the pre-boost voltage VL on the side of the battery 50 at step S130, on the other hand, it is determined whether the maximum average amplitude VHap of the boosted voltage VH input at step S100 is not less than a predetermined reference value Vref (for example, 50 V) (step S160). When the maximum average amplitude VHap is not less than the predetermined reference value Vref, it is assumed that resonance of an uncontrollable level occurs in the booster converter 55 in application of the overmodulation PWM control or the rectangular-wave control for the control methods of the inverters 41 and 42. In this case, the CPU resets the target boosted voltage VHtag to a predetermined value V1 that is higher than the rated voltage of the battery 50 (step S170), and resets the control method flags Fmod1 and Fmod2 to 0 to adopt the sine-wave PWM control for the control methods of the inverters 41 and 42 (step S180). After such resetting, the boost control routine executes the processing of steps S140 and S150 and returns to repeat the series of processing of and after step S100. In the hybrid vehicle 20 of the embodiment, even when the target operation point of the motor MG1 or MG2 (defined by the motor torque command and the motor rotation speed) is not included in the specified resonance range, on the expectation of the occurrence of resonance of an uncontrollable level based on the value of the boosted voltage VH, the booster converter 55 is controlled to increase the boosted voltage VH, which is to be supplied to the inverters 41 and 42, up to the target boosted voltage VHtag. Concurrently the inverters 41 and 42 are controlled under the sine-wave PWM control to ensure output of torques equivalent to the torque commands Tm1* and Tm2* from the motors MG1 and MG2. When there is no requirement for boosting the pre-boost voltage VL on the side of the battery 50 at step S130 and the maximum average amplitude VHap of the boosted voltage VH is less than the predetermined reference value Vref at step S160, the CPU sets the boosted voltage VH input at step S100 to the boosted voltage command VH* used for switching control of the booster converter 55 (step S190). The boost control routine then returns to repeat the series of processing of and after step S100 without performing the switching control of the booster converter 55 for the boosting operation.

As described above, in the hybrid vehicle 20 of the embodiment, the booster converter 55 is controlled to make the boosted voltage VH as the voltage level on the side of the inverters 41 and 42 approach to the target boosted voltage VHtag corresponding to the target operation point of the motor MG1 or MG2. The sine-wave PWM control, the overmodulation PWM control, and the rectangular-wave control are selectively applied for the control methods of the inverters 41 and 42 in the state of non-boosting the pre-boost voltage VL on the side of the battery 50 by the booster converter 55 and in the state of boosting the pre-boost voltage VL on the side of the battery 50 by the booster converter 55. The inverters 41 and 42 are then controlled by the selected control methods to ensure output of torques equivalent to torque commands Tm1* and Tm2* from the motors MG1 and MG2. This expands the application range of the rectangular-wave control, which is generally adopted only in the state of boosting the pre-boost voltage VL on the side of the battery 50 by the booster converter 55, to the state of non-boosting the pre-boost voltage VL on the side of the battery 50 by the booster converter 55. Even when the extension of the non-boosting zone reduces the opportunities of boosting the pre-boost voltage VL on the side of the battery 50 by the booster converter 55, the expanded application range of the rectangular-wave control ensures the sufficient power outputs of the motors MG1 and MG2 and thereby desirably improves the energy efficiency in the drive control of the motors MG1 and MG2. When the target operation point of the motor MG1 or MG2 is included in the resonance range specified by the operation points of the motor MG1 or MG2 in the occurrence of resonance in the booster converter 55, the hybrid vehicle 20 of the embodiment controls the booster converter 55 to make the voltage on the side of the inverters 41 and 42 approach to the preset target boosted voltage VHtag that is higher than the voltage on the side of the battery 50, while controlling the inverters 42 and 42 by the sine-wave PWM control method (steps S110, S120, S140, and S150). When the target operation point of the motor MG1 or MG2 is included in the resonance range, the boost control procedure of the embodiment adopts the sine-wave PWM control having the high control accuracy for the control methods of the inverters 41 and 42. This arrangement ensures adequate control of the inverters 41 and 42 and prevents any overvoltage or overcurrent from being applied to or being flowed through the booster converter 55 and the smoothing capacitors 57 and 59. When the target operation point of the motor MG1 or MG2 is included in the resonance range, the inverters 41 and 42 are controlled by the sine-wave PWM control method after an increase of the voltage to be supplied to the inverters 41 and 42 (boosted voltage VH). This arrangement ensures the sufficient power outputs from the motors MG1 and MG2 even under application of the sine-wave PWM control having relatively small values of the modulation factor Kmd. The configuration of the hybrid vehicle 20 ensures the sufficient power outputs from the motors MG1 and MG2 and improves the energy efficiency, while effectively preventing a potential trouble, such as overvoltage or overcurrent, caused by the occurrence of resonance in the booster converter 55.

In the hybrid vehicle 20 of the embodiment discussed above, the target boosted voltage setting map is designed to divide the operation range of each of the motors MG1 and MG2 into the non-boosting zone where the pre-boost voltage VL on the side of the battery 50 is not boosted by the booster converter 55 and the boosting zone where the pre-boost voltage VL is boosted by the booster converter 55 and to specify the resonance range to be included in the boosting zone. The control method setting map is designed to adopt the sine-wave PWM control for the control method in the resonance range and to adopt the sine-wave PWM control for the control method in a certain area including the target operation point of the other of the motors MG1 and MG2 when the target operation point of one of the motors MG1 and MG2 is included in the resonance range. The boost control procedure of the embodiment refers to the target boosted voltage setting maps for the motors MG1 and MG2 to set the target boosted voltage VHtag as the target value of the boosted voltage VH (step S110), and refers to the control method setting maps for the motors MG1 and MG2 to specify the control methods of the inverters 41 and 42 (step S120). The procedure of the embodiment divides the operation range of each of the motors MG1 and MG2 into the non-booting zone and the boosting zone and specifies the resonance range to be included in the boosting zone. When the target operation point of one of the motors MG1 and MG2 is included in the resonance range, both the inverters 41 and 42 (the motors MG1 and MG2) are controlled by the sine-wave PWM control method. This arrangement readily and effectively prevents a potential trouble induced by the occurrence of resonance in the booster converter 55.

Even in the case where the pre-boost voltage VL on the side of the battery 50 is not boosted by the booster converter 55 corresponding to the target boosted voltage VHtag set with reference to the target boosted voltage setting maps, on the expectation of the occurrence of resonance of an uncontrollable level in the booster converter 55 under application of either the overmodulation PWM control or the rectangular-wave control of the inverters 41 and 42 based on the maximum average amplitude VHap of the boosted voltage VH, the boost control procedure of the embodiment resets the target boosted voltage VHtag to the predetermined value V1 that is higher than the rated voltage of the battery 50 (step S170). The boost control procedure also resets the control method flags Fmod1 and Fmod2 to 0 to apply the sine-wave PWM control for the control methods of the inverters 41 and 42 (steps S180). This arrangement effectively prevents a potential trouble induced by the occurrence of resonance in the booster converter 55, which is not controllable according to the target boosted voltage setting maps and the control method setting maps designed to maximize the non-boosting zone and minimize the resonance range. The occurrence of resonance in the booster converter 55 is determined, based on the maximum average amplitude VHap of the boosted voltage VH that is to be supplied to the inverters 41 and 42. This arrangement ensures appropriate determination of the occurrence of resonance.

The boost control routine of the embodiment shown in the flowchart of FIG. 3 refers to the control method setting maps defining the control methods of the inverters 41 and 42 in correlation to the target operation points of the motors MG1 and MG2 and specifies the controls to be actually adopted for the control methods of the inverters 41 and 42. This procedure is, however, neither essential nor restrictive. The control methods of the inverters 41 and 42 may be determined by taking into account the calculated values of the modulation factor Kmd, in addition to or in place of the target operation points of the motors MG1 and MG2 in the state of execution or in the state of non-execution of the boost control routine. Determining the control methods of the inverters 41 and 42 based on the values of the modulation factor Kmd allows a shift of the control method between the rectangular-wave control and the sine-wave PWM control via the overmodulation PWM control.

Figure 6:
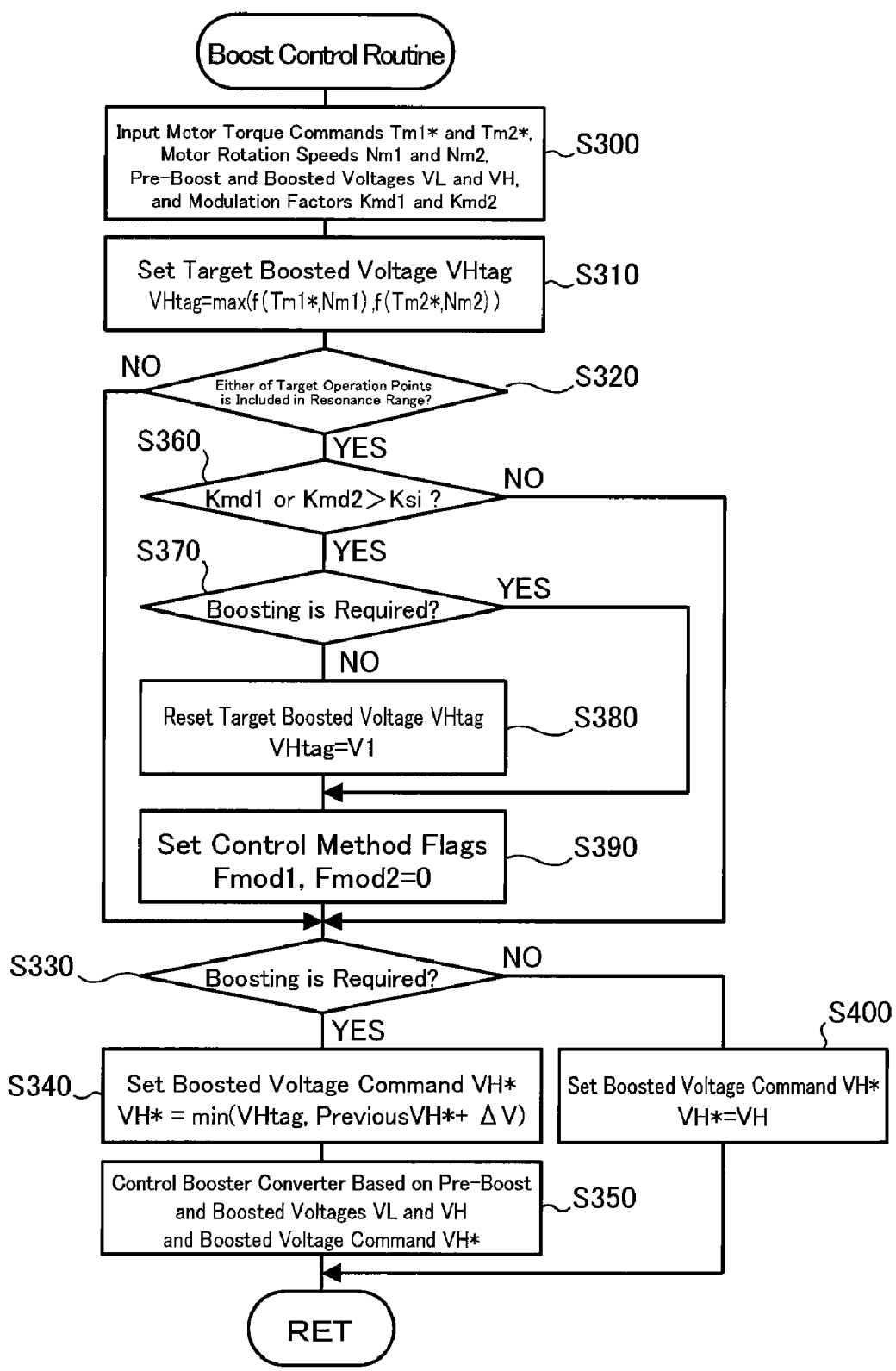
FIG. 6 is a flowchart showing a modified flow of the boost control routine executed by the motor ECU.

One modification of the embodiment is described below. FIG. 6 is a flowchart showing a modified flow of the boost control routine executable by the motor ECU 40 in the hybrid vehicle 20 of the embodiment.

In the modified boost control routine of FIG. 6, the CPU (not shown) of the motor ECU 40 first inputs data required for control, that is, the torque commands Tm1* and Tm2* of the motors MG1 and MG2 set by the hybrid ECU 70, the current rotation speeds Nm1 and Nm2 of the motors MG1 and MG2, the pre-boost voltage VL, the boosted voltage VH, and calculated modulation factors Kmd1 and Kmd2 of the inverters 41 and 42 (step S300). A concrete procedure computes an induced voltage (line voltage amplitude) Vamp from a d-axis voltage command value Vd* and a q-axis voltage command value Vq* generated in the switching control of the inverters 41 and 42 according to Equations (1) and (2) given below and divides the computed induced voltage Vamp by the boosted voltage VH according to Equation (3) given below to calculate the modulation factor Kmd1 or Kmd2:

$$Vamp = |Vd^*| \cdot \cos \phi + |Vq^*| \cdot \sin \phi \quad (1)$$

$$\tan \phi = Vq^*/Vd^* \quad (2)$$

$$Kmd1 \text{ or } Kmd2 = Vamp/VH \quad (3)$$

Figure 7:
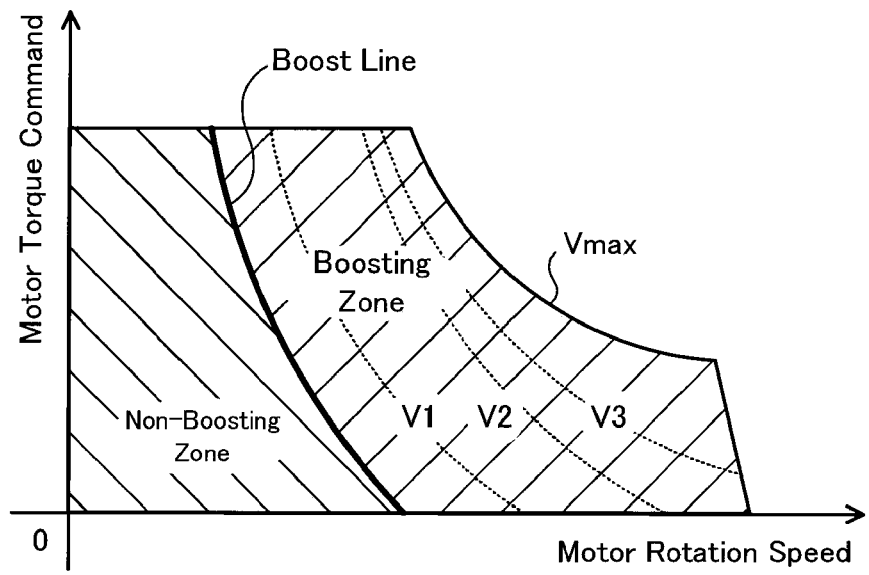
FIG. 7 shows another example of the target boosted voltage setting map.

After the data input at step S300, the CPU refers to target boosted voltage setting maps provided in advance for the motor MG1 and for the motor MG2 and stored in the storage unit (not shown) of the motor ECU 40 and sets the greater between a value read corresponding to the target operation point of the motor MG1 (defined by the torque command Tm1* and the rotation speed Nm1) from the target boosted voltage setting map for the motor MG1 and a value read corresponding to the target operation point of the motor MG2 (defined by the torque command Tm2* and the rotation speed Nm2) from the target boosted voltage setting map for the motor MG2 to the target boosted voltage VHtag (step S310) FIG. 7 shows one example of the target boosted voltage setting map used at step S310. This illustrated example shows a first quadrant of the target boosted voltage setting map, that is, an area having positive values for both the motor torque command and the motor rotation speed. The target boosted voltage setting map of FIG. 7 is designed to set each operation point having the higher efficiency of the electric driving system in the non-boosting state than the efficiency in the boosting state to a non-boosting zone and to set each operation point having the higher efficiency in the boosting state than the efficiency in the non-boosting state to a boosting zone. This divides the operation range of the motor MG1 or MG2 into the non-boosting zone where the pre-boost voltage VL on the side of the battery 50 is not boosted by the booster converter 55 and the boosting zone where the pre-boost voltage VL is boosted by the booster converter 55. The target boosted voltage setting map of FIG. 7 does not take into account the resonance occurring in the booster converter 55, unlike the target boosted voltage setting map of FIG. 3. A boost line as a borderline between the non-boosting zone and the boosting zone is accordingly not extended into the non-boosting zone but forms a smooth curve.

After setting the target boosted voltage VHtag at step S310, the CPU determines whether either one of the target operation point of the motor MG1 and the target operation point of the motor MG2 is included in a corresponding resonance range specified by the operation points of the motor MG1 or MG2 in the occurrence of resonance in the booster converter 55 (step S320). A concrete determination procedure of the embodiment provides maps specifying resonance ranges with regard to the respective motors MG1 and MG2 and performs the determination of step S320 based on the torque commands Tm1* and Tm2* and the current rotation speeds Nm1 and Nm2 of the motors MG1 and MG2 with reference to the maps. When neither of the target operation point of the motor MG1 and the target operation point of the motor MG2 is included in the corresponding resonance range at step S320, the CPU determines the requirement or non-requirement for boosting the pre-boost voltage VL on the side of the battery 50, for example, based on the result of comparison between the target boosted voltage VHtag set at step S310 and the pre-boost voltage VL input at step S300 (step S330). Upon the requirement for boosting the pre-boost voltage VL on the side of the battery 50 at step S330, the CPU sets the boosted voltage command VH* (step S340) and performs switching control of the transistors T31 and T31 of the booster converter 55 (step S350) in the same manner as steps S140 and S150 in the boost control routine of the first embodiment shown in FIG. 3. The modified boost control routine of FIG. 6 then returns to repeat the series of processing of and after step S300. Upon non-requirement for boosting the pre-boost voltage VL on the side of the battery 50 at step S330, on the contrary, the CPU sets the boosted voltage VH input at step S300 to the boosted voltage command VH* (step S400) in the same manner as step S190 in the boost control routine of FIG. 3. The modified boost control routine then returns to repeat the series of processing of and after step S300 without performing the switching control of the booster converter 55 for the boosting operation.

When either of the target operation point of the motor MG1 and the target operation point of the motor MG2 is included in the corresponding resonance range at step S320, on the other hand, the CPU subsequently determines whether either one of the modulation factors Kmd1 and Kmd2 input at step S300 exceeds a preset reference value Ksi (step S360). The reference value Ksi is set to a maximum value of the modulation factor in the sine-wave PWM control or a slightly smaller value than the maximum value. When either one of the modulation factors Kmd1 and Kmd2 exceeds the preset reference value Ksi at step S360, it is expected that at least one of the inverters 41 and 42 is controlled by the overmodulation PWM control method or the rectangular-wave control method. In response to an affirmative answer at step S360, the CPU determines the requirement or non-requirement for boosting the pre-boost voltage VL on the side of the battery 50, for example, based on the result of comparison between the target boosted voltage VHtag set at step S310 and the pre-boost voltage VL input at step S300 (step S370). Upon non-requirement for boosting the pre-boost voltage VL on the side of the battery 50 at step S370, the CPU resets the target boosted voltage VHtag to a predetermined value Vi that is, for example, a value higher than the rated voltage of the battery 50 (step S380) and sets the control method flags Fmod1 and Fmod2 to 0 to apply the sine-wave PWM control for the control methods of the inverters 41 and 42 (steps S390). Upon the requirement for boosting the pre-boost voltage VL on the side of the battery 50 at step S370, on the other hand, the CPU skips the processing of step S380 and sets the control method flags Fmod1 and Fmod2 to 0 (steps S390). After the processing of step S390, it is determined at step S330 that the pre-boost voltage VL on the side of the battery 50 is to be boosted, irrespective of execution or non-execution of step S380. The modified boost control routine then executes the processing of steps S340 and S350 and returns to repeat the series of processing of and after step S300. In response to setting both the control method flags Fmod1 and Fmod2 to 0 at step S390, the inverters 41 and 42 are controlled by the sine-wave PWM control method to ensure output of torques equivalent to the torque commands Tm1* and Tm2* from the motors MG1 and MG2.

When the target operation point of the motor MG1 or MG2 is included in the resonance range, the modified boost control routine of FIG. 6 adopts the sine-wave PWM control having the high control accuracy for the control methods of the inverters 41 and 42. This arrangement ensures adequate control of the inverters 41 and 42 and prevents any overvoltage or overcurrent from being applied to or being flowed through the booster converter 55 and the smoothing capacitors 57 and 59. The modified boost control routine of FIG. 6 controls the booster converter 55 to immediately start the boosting operation, when the target operation point of the motor MG1 or MG2 enters the resonance range during the control of the inverters 41 and 42 by the sine-wave PWM control method. This arrangement does not change over the control method from the sine-wave PWM control to the overmodulation PWM control or the rectangular-wave control but immediately enables the inverters 41 and 42 to be adequately controlled in the sine-wave PWM control. When the target operation point of the motor MG1 or MG2 is included in the resonance range, the inverters 41 and 42 are controlled by the sine-wave PWM control method after an increase of the voltage to be supplied to the inverters 41 and 42 (boosted voltage VH). This arrangement ensures the sufficient power outputs from the motors MG1 and MG2 even under application of the sine-wave PWM control having relatively small values of the modulation factors Kmd1 and Kmd2. The modified boost control routine of FIG. 6 specifies the resonance ranges of the respective motors MG1 and MG2 with the higher accuracy and accordingly minimizes the boosting operation of the booster converter 55 in response to an inclusion of the target operation point of the motor MG1 or MG2 in the corresponding resonance range. This desirably improves the energy efficiency in the drive control of the motors MG1 and MG2. The modified boost control routine of FIG. 6 ensures the sufficient power outputs from the motors MG1 and MG2 and improves the energy efficiency, while effectively preventing a potential trouble, such as overvoltage or overcurrent, caused by the occurrence of resonance in the booster converter 55.

Figure 8:
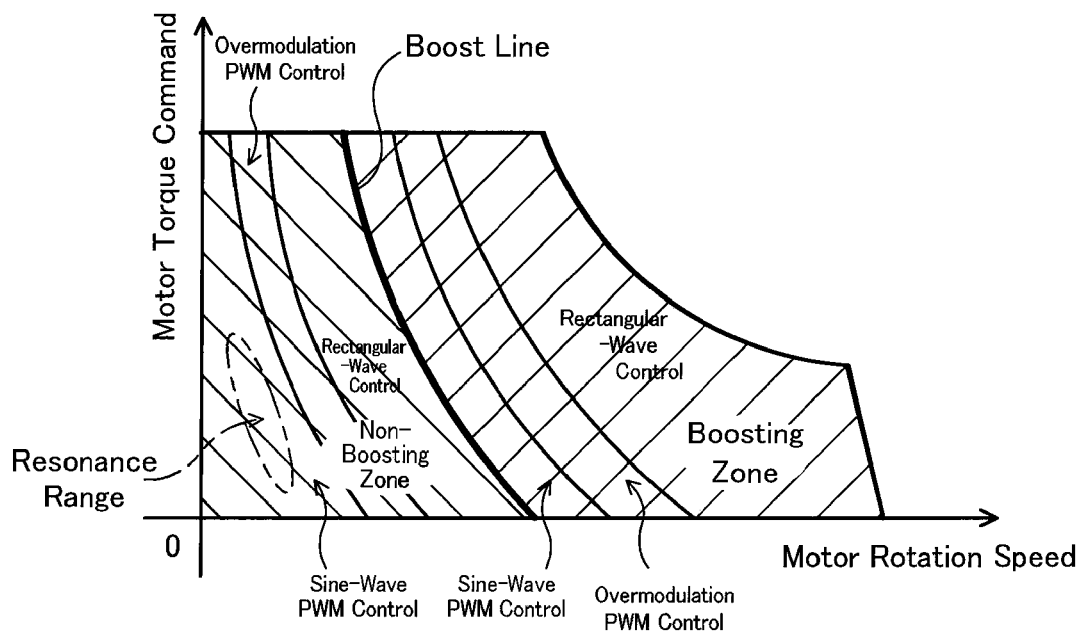
FIG. 8 shows another example of the control method setting map used in one modified example of the invention to specify the control method of inverter in correlation to the operation point of the motor MG1 or MG2.

FIG. 8 shows another example of the control method setting map used in one modified example of the invention to specify the control method of the inverter 41 or 42 in correlation to the operation point of the motor MG1 or MG2. The control method setting map of FIG. 8 used for controlling the inverter 41 or 42 also expands the application range of the rectangular-wave control, which is generally adopted only in the state of boosting the pre-boost voltage VL on the side of the battery 50 by the booster converter 55, to the state of non-boosting the pre-boost voltage VL on the side of the battery 50 by the booster converter 55. Even in the event of reduction of the opportunities of boosting the pre-boost voltage VL on the side of the battery 50 by the booster converter 55, the expanded application range of the rectangular-wave control ensures the sufficient power outputs of the motors MG1 and MG2 and thereby desirably improves the energy efficiency in the drive control of the motors MG1 and MG2. A variation in specific parameter of the booster converter 55, for example, an impedance of the reactor L or an electrostatic capacitance of the smoothing capacitor 57 or 59, changes the resonance range specified by the operation points of the motor MG1 or MG2 in the occurrence of resonance in the booster converter 55. The parameters of the reactor L and the smoothing capacitors 57 and 59 in the booster converter 55 are thus determinable to cause the resonance range to be present in the non-boosting zone and to be included in a control area of the sine-wave PWM control adopted for the control methods of the inverters 41 and 42 as shown in FIG. 8. Adequate determination of these parameters ensures the sufficient power outputs from the motors MG1 and MG2 without requiring the booster converter 55 to boost the pre-boost voltage VL on the side of the battery 50, when the target operation point of the motor MG1 or MG2 is included in the resonance range. Application of the sine-wave PWM control having the high control accuracy allows adequate control of the inverters 41 and 42 and prevents any overvoltage or overcurrent from being applied to or being flowed through the booster converter 55 and the smoothing capacitors 57 and 59. The determination of the parameters of the reactor L and the smoothing capacitors 57 and 59 in the booster converter 55 for causing the resonance range to be present in the non-boosting zone and to be included in the control area of the sine-wave PWM control adopted for the control methods of the inverters 41 and 42 ensures the sufficient power outputs from the motors MG1 and MG2 and improves the energy efficiency, while effectively preventing a potential trouble, such as overvoltage or overcurrent, caused by the occurrence of resonance in the booster converter 55. One fundamental method applicable to cause the resonance range to be present in the non-boosting zone and to be included in the control area of the sine-wave PWM control adopted for the control methods of the inverters 41 and 42 is increasing the electrostatic capacitance of the smoothing capacitor 57.

Figure 9:
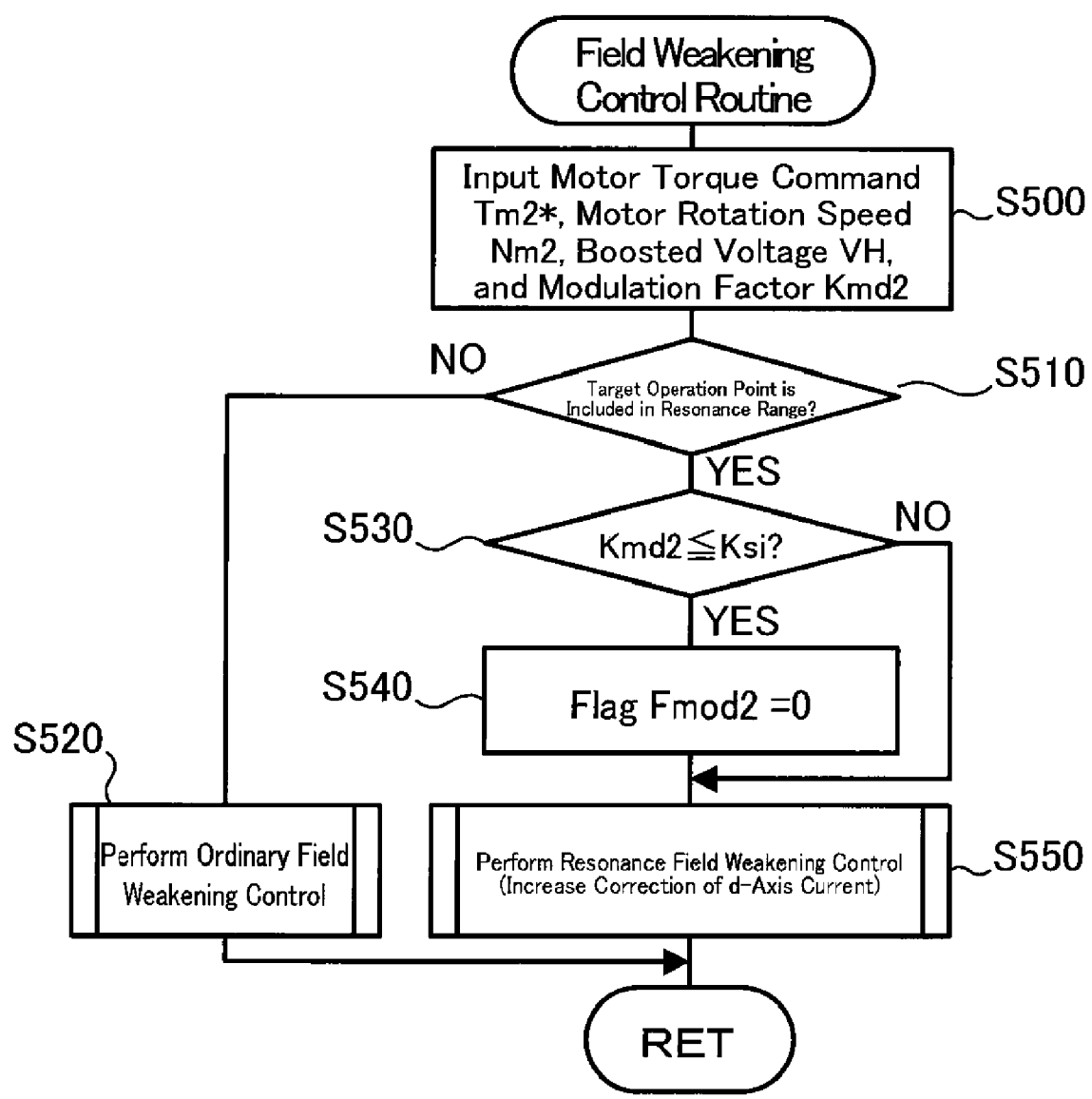
FIG. 9 is a flowchart showing a field weakening control routine executed by the motor ECU in the modified example.

FIG. 9 is a flowchart showing a field weakening control routine executed in a hybrid vehicle of the modified configuration that adopts the control method setting map of FIG. 8 to selectively apply the sine-wave PWM control, the overmodulation PWM control, and the rectangular-wave control for the control methods of the inverters 41 and 42 both in the non-boosting zone and in the boosting zone. The field weakening control routine of FIG. 9 is performed at preset time intervals by the motor ECU 40 under application of the rectangular-wave control for the control method of the inverter 42 provided for the motor MG2.

In the field weakening control routine of FIG. 9, the CPU (not shown) of the motor ECU 40 first inputs data required for control, that is, the torque command Tm2* of the motor MG2 set by the hybrid ECU 70, the current rotation speed Nm2 of the motor MG2, the boosted voltage VH, and the calculated modulation factor Kmd2 of the inverter 42 (step S500). The modulation factor Kmd2 is calculated according to Equations (1) through (3) given previously. The CPU determines whether the target operation point of the motor MG2 (defined by the torque command Tm2* and the rotation speed Nm2) is included in a resonance range specified by the operation points of the motor MG2 in the occurrence of resonance in the booster converter 55 (step S510). Upon determination at step S510 that the target operation point of the motor MG2 is not included in the resonance range, the CPU performs ordinary field weakening control (step S520) and returns to repeat the processing of and after step S500. The 'ordinary field weakening control' of step S520 adjusts the field weakening current (d-axis current) to make the boosted voltage VH, which is to be supplied to the inverters 41 and 42, higher than the induced voltage generated in the motors MG1 and MG2 under a predetermined condition according to the requirements. The ordinary field weakening control is mainly performed in the case of application of the rectangular-wave control in the boosting zone. Upon determination at step S510 that the target operation point of the motor MG2 is included in the resonance range, on the other hand, the CPU subsequently determines whether the modulation factor Kmd2 input at step S500 is not higher than a preset reference value Ksi (step S530). The reference value Ksi is set to a maximum value of the modulation factor in the sine-wave PWM control or a slightly smaller value than the maximum value. Upon determination at step S530 that the input modulation factor Kmd2 exceeds the preset reference value Ksi, the CPU performs resonance field weakening control (step S550) and returns to repeat the processing of and after step S500. The 'resonance field weakening control' of step S550 increases the field weakening current (d-axis current) to advance the current phase, compared with the ordinary field weakening control. Upon determination at step S530 that the modulation factor Kmd2 decreases to or below the preset reference value Ksi, it is expected that the induced voltage in the motor MG2 is sufficiently lowered to allow the application of the sine-wave PWM control. The CPU accordingly sets the control method flag Fmod2 to 0 (step S540), performs the resonance field weakening control (step S550), and returns to repeat the processing of and after step S500.

Figure 10:
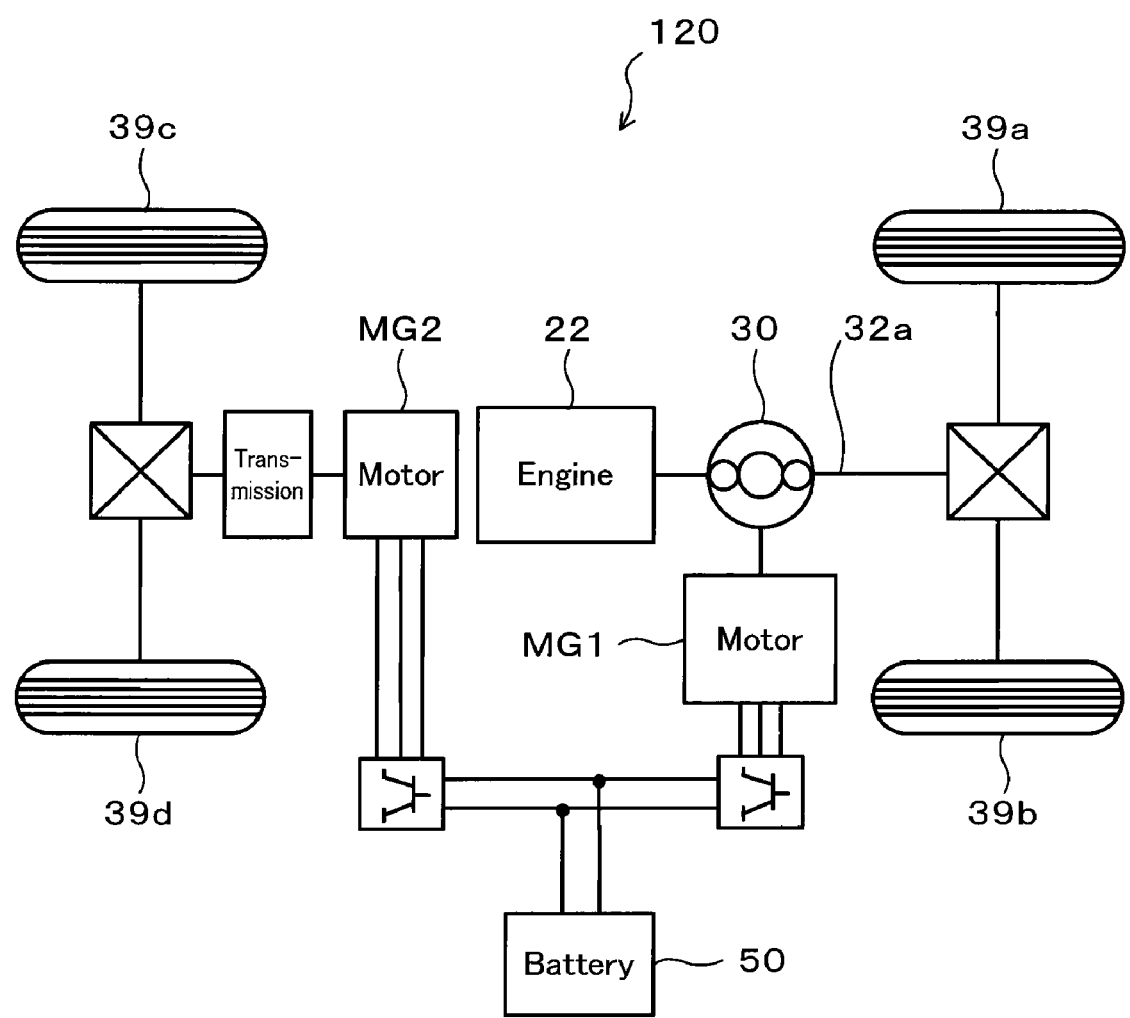
FIG. 10 schematically illustrates the configuration of another hybrid vehicle in one modified example.
Figure 11:
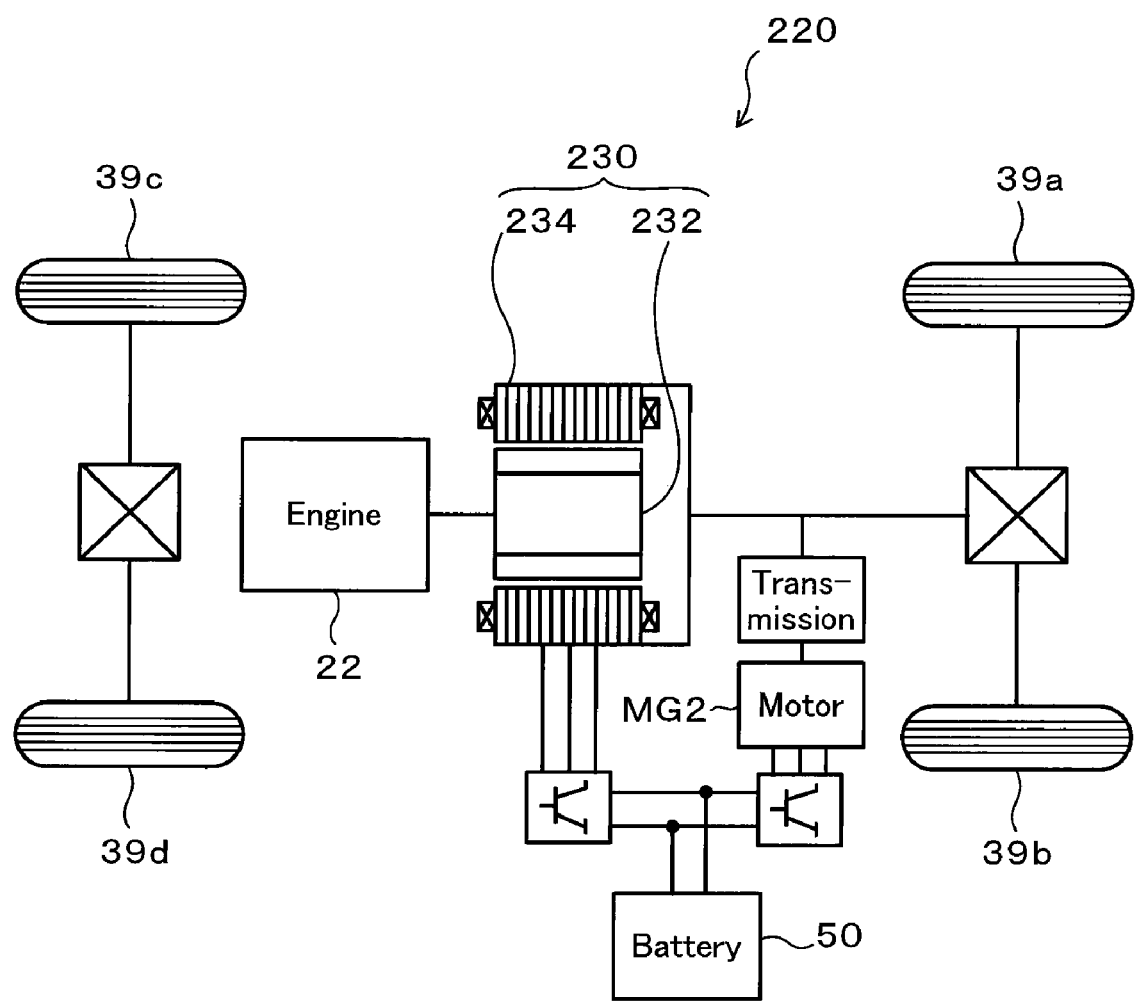
FIG. 11 schematically illustrates the configuration of still another hybrid vehicle in another modified example.

When the target operation point of the motor MG2 enters the resonance range under control of the inverter 42 by the rectangular-wave control or the overmodulation PWM control in the state of non-boosting the pre-boost voltage VL on the side of the battery 50 by the booster converter 55, the field weakening control routine of FIG. 9 continues controlling the inverter 42 by the rectangular-wave control or the overmodulation PWM control with an increase in field weakening current (step S550). In response to allowance for a shift of the control method from the rectangular-wave control or the overmodulation PWM control to the sine-wave PWM control (steps S530 and S540), the field weakening control routine of FIG. 9 controls the inverter 42 by the sine-wave PWM control. In the case where the target operation point of the motor MG2 enters the resonance range during the rectangular-wave control or the overmodulation PWM control, the inverter 42 is continuously controlled by the rectangular-wave control or the overmodulation PWM control with an increase in field weakening current. Such control with the increased field weakening current effectively lowers the induced voltage of the motor MG2 (inter-terminal voltage) and allows a shift of the control method to the sine-wave PWM control without requiring the booster converter 55 to boost the pre-boost voltage VL on the side of the battery 50. The control method is shifted to the sine-wave PWM control at the time of a sufficient decrease of the induced voltage of the motor MG2. This arrangement assures the sufficient power output from the motor MG2, while ensuring adequate control of the inverter 42 and preventing any overvoltage or overcurrent from being applied to or being flowed through the booster converter 55 and the smoothing capacitors 57 and 59. The field weakening control routine of FIG. 9 ensures the sufficient power outputs from the motors MG1 and MG2 and improves the energy efficiency, while effectively preventing a potential trouble, such as overvoltage or overcurrent, caused by the occurrence of resonance in the booster converter 55. In the hybrid vehicle 20 of the embodiment, the ring gear shaft 32a as the axle and the motor MG2 are interconnected via the reduction gear 35 arranged to reduce the rotation speed of the motor MG2 and transmits the reduced rotation speed to the ring gear shaft 32a. The reduction gear 35 may be replaced by a transmission designed to have two different speeds, for example, Hi and Lo or three or a greater number of different speeds and configured to change the rotation speed of the motor MG2 and transmit the changed rotation speed to the ring gear shaft 32a. In the hybrid vehicle 20 of the embodiment, the power of the motor MG2 is output to the axle connecting with the ring gear shaft 32a. The scope of the invention is, however, not restricted to the hybrid vehicle of this configuration. The technique of the invention is also applicable to a hybrid vehicle 120 of a modified configuration shown in FIG. 10. In the hybrid vehicle 120 of FIG. 10, the power of the motor MG2 is connected to another axle (an axle linked with wheels 39c and 39d) that is different from the axle connecting with the ring gear shaft 32a (the axle linked with the wheels 39a and 39b). In the hybrid vehicle 20 of the embodiment, the power of the engine 22 is output via the power distribution integration mechanism 30 to the ring gear shaft 32a as the axle linked with the wheels 39a and 39b. The scope of the invention is, however, not restricted to the hybrid vehicle of this configuration. The technique of the invention is also applicable to a hybrid vehicle 220 of another modified configuration shown in FIG. 11. The hybrid vehicle 220 of FIG. 11 is equipped with a pair-rotor motor 230. The pair-rotor motor 230 includes an inner rotor 232 connected to the crankshaft of the engine 22 and an outer rotor 234 connected to the axle for outputting power to the wheels 39a and 39b. The pair-rotor motor 230 transmits part of the output power of the engine 22 to the axle, while converting the residual engine output power into electric power. The engine 22 is not restricted to the internal combustion engine designed to consume a hydrocarbon fuel, such as gasoline or light oil, and thereby output power, but may be an engine of any other design, for example, a hydrogen engine. The motors MG1 and MG2 are not restricted to the synchronous generator motors but may be motors of any other configuration or design, for example, induced motors.

The primary elements in the embodiment and its modified examples are mapped to the primary constituents in the claims of the invention as described below. The battery 50, the motors MG2 and MG2, and the inverters 41 and 42 in the embodiment and the modified examples are respectively equivalent to the 'direct-current power source', the 'motor', and the 'motor drive circuit' in the claims of the invention. The booster converter 55 and the smoothing capacitors 57 and 59 in the embodiment and the modified examples correspond to the 'voltage regulator' in the claims of the invention. The motor ECU 40 executing the boost control routine of FIG. 3 or the boost control routine of FIG. 6 in the embodiment corresponds to the 'voltage controller' in the claims of the invention. The motor ECU 40 executing the field weakening control routine of FIG. 9 in the modified example corresponds to the 'drive circuit controller' in the claims of the invention. The above mapping of the primary elements in the embodiment and its modified examples to the primary constituents in the claims of the invention is not restrictive in any sense but is only illustrative for concretely describing the modes of carrying out the invention. The scope and spirit of the present invention are indicated by the appended claims, rather than by the foregoing description.

Namely the embodiment and its modified examples discussed above are to be considered in all aspects as illustrative and not restrictive. There may be many other modifications, changes, and alterations without departing from the scope or spirit of the main characteristics of the present invention.

The technique of the invention is preferably applied to the manufacturing industries of the motor drive control apparatus and the vehicle equipped with the motor drive control apparatus.

What is claimed is:

1. A motor drive control apparatus configured to drive and control a motor with a supply of electric power from a direct-current power source, the motor drive control apparatus comprising:
   a motor drive circuit configured to selectively apply one voltage between a PWM voltage and a rectangular-wave voltage and drive the motor with the selected voltage;
   a voltage regulator designed to have a reactor and a capacitor and configured to regulate a voltage on a side of the motor drive circuit relative to a voltage on a side of the direct-current power source;
   a voltage controller configured to control the voltage regulator to make the voltage on the side of the motor drive circuit approach to a target voltage corresponding to a target operation point of the motor, the voltage controller controlling the voltage regulator to make the voltage on the side of the motor drive circuit approach to a preset target voltage that is higher than the voltage on the side of the direct-current power source when the target operation point of the motor is included in a resonance range specified by operation points of the motor in the occurrence of resonance in the voltage regulator; and
   a drive circuit controller configured to select a control mode of the motor drive circuit between PWM control with the PWM voltage and rectangular-wave control with the rectangular-wave voltage in a state of non-regulating the voltage on the side of the motor drive circuit relative to the voltage on the side of the direct-current power source by the voltage regulator and in a state of regulating the voltage on the side of the motor drive circuit relative to the voltage on the side of the direct-current power source by the voltage regulator and to control the motor drive circuit by the selected control mode to ensure output of a target torque from the motor corresponding to the target operation point of the motor, the drive circuit controller selecting the PWM control for the control mode of the motor drive circuit and controlling the motor drive circuit by the PWM control when the target operation point of the motor is included in the resonance range.

2. The motor drive control apparatus in accordance with claim 1, wherein
an operation range of the motor is divided in advance into a non-boosting zone where a voltage supplied from the direct-current power source is not boosted by the voltage regulator and a boosting zone where the voltage supplied from the direct-current power source is boosted by the voltage regulator, wherein the resonance range is made to be included in the boosting zone, and wherein the voltage controller controls the voltage regulator to boost a supply voltage, which is to be supplied to the motor drive circuit, to a target voltage corresponding to the target operation point of the motor when the target operation point of the motor is included in the boosting zone.

3. The motor drive control apparatus in accordance with claim 1, wherein
the drive circuit controller determines the control mode of the motor drive circuit corresponding to at least one of the target operation point of the motor and a modulation factor of voltage conversion by the motor drive circuit with referring to a predetermined control mode setting restriction of defining a relation of the control mode of the motor drive circuit to at least one of the target operation point and the modulation factor, and controls the motor drive circuit by the determined control mode.

4. The motor drive control apparatus in accordance with claim 1, the motor drive control apparatus further comprising:
a resonance determination module configured to determine whether resonance over a preset degree occurs in the voltage regulator,
wherein upon determination of the occurrence of the resonance over the preset degree in the voltage regulator by the resonance determination module, the voltage controller controls the voltage regulator to boost a supply voltage, which is to be supplied to the motor drive circuit, to a preset target voltage, and the drive circuit controller controls the motor drive circuit by the PWM control to ensure output of the target torque from the motor corresponding to the target operation point of the motor.

5. The motor drive control apparatus in accordance with claim 4, wherein the resonance determination module determines the occurrence of resonance in the voltage regulator based on a maximum amplitude of the voltage on the side of the motor drive circuit.

6. A vehicle equipped with a motor driven and controlled with a supply of electric power from a direct-power source to output a driving power, the vehicle comprising:
a motor drive circuit configured to selectively apply one voltage between a PWM voltage and a rectangular-wave voltage and drive the motor with the selected voltage;
a voltage regulator designed to have a reactor and a capacitor and configured to regulate a voltage on a side of the motor drive circuit relative to a voltage on a side of the direct-current power source;
a voltage controller configured to control the voltage regulator to make the voltage on the side of the motor drive circuit approach to a target voltage corresponding to a target operation point of the motor, the voltage controller controlling the voltage regulator to make the voltage on the side of the motor drive circuit approach to a preset target voltage that is higher than the voltage on the side of the direct-current power source when the target operation point of the motor is included in a resonance range specified by operation points of the motor in the occurrence of resonance in the voltage regulator; and
a drive circuit controller configured to select a control mode of the motor drive circuit between PWM control with the PWM voltage and rectangular-wave control with the rectangular-wave voltage in a state of non-regulating the voltage on the side of the motor drive circuit relative to the voltage on the side of the direct-current power source by the voltage regulator and in a state of regulating the voltage on the side of the motor drive circuit relative to the voltage on the side of the direct-current power source by the voltage regulator and to control the motor drive circuit by the selected control mode to ensure output of a target torque from the motor corresponding to the target operation point of the motor, the drive circuit controller selecting the PWM control for the control mode of the motor drive circuit and controlling the motor drive circuit by the PWM control when the target operation point of the motor is included in the resonance range.

7. A motor drive control method of driving and controlling a motor by utilizing a direct-current power source, a motor drive circuit configured to selectively apply one voltage between a PWM voltage and a rectangular-wave voltage and drive the motor with the selected voltage, and a voltage regulator designed to have a reactor and a capacitor and configured to regulate a voltage on a side of the motor drive circuit relative to a voltage on a side of the direct-current power source, the motor drive control method comprising the steps of:
(a) controlling the voltage regulator to make the voltage on the side of the motor drive circuit approach to a target voltage corresponding to a target operation point of the motor, the step (a) controlling the voltage regulator to make the voltage on the side of the motor drive circuit approach to a preset target voltage that is higher than the voltage on the side of the direct-current power source when the target operation point of the motor is included in a resonance range specified by operation points of the motor in the occurrence of resonance in the voltage regulator; and
(b) selecting a control mode of the motor drive circuit between PWM control with the PWM voltage and rectangular-wave control with the rectangular-wave voltage in a state of non-regulating the voltage on the side of the motor drive circuit relative to the voltage on the side of the direct-current power source by the voltage regulator and in a state of regulating the voltage on the side of the motor drive circuit relative to the voltage on the side of the direct-current power source by the voltage regulator and controlling the motor drive circuit by the selected control mode to ensure output of a target torque from the motor corresponding to the target operation point of the motor, the step (b) selecting the PWM control for the control mode of the motor drive circuit and controlling the motor drive circuit by the PWM control when the target operation point of the motor is included in the resonance range.

\* \* \* \* \*